(12) United States Patent
Sadano et al.

(10) Patent No.: US 7,444,224 B2
(45) Date of Patent: Oct. 28, 2008

(54) LANE DEPARTURE PREVENTION APPARATUS

(75) Inventors: On Sadano, Atsugi (JP); Masahiro Ozaki, Yokohama (JP); Yoshitaka Uemura, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 552 days.

(21) Appl. No.: 10/960,724

(22) Filed: Oct. 8, 2004

(65) Prior Publication Data
US 2005/0107939 A1 May 19, 2005

(30) Foreign Application Priority Data

| Nov. 14, 2003 | (JP) | ............................. 2003-385611 |
| Nov. 14, 2003 | (JP) | ............................. 2003-385612 |
| Nov. 18, 2003 | (JP) | ............................. 2003-388208 |

(51) Int. Cl.
*B60T 8/172* (2006.01)
*B60T 8/175* (2006.01)

(52) U.S. Cl. .............................. 701/80; 701/38; 701/41; 701/301

(58) Field of Classification Search .................. 701/91, 701/92, 116, 158
See application file for complete search history.

(56) References Cited

U.S. PATENT DOCUMENTS

| 5,483,453 | A | * | 1/1996 | Uemura et al. ................. 701/23 |
| 5,906,650 | A | * | 5/1999 | Tsuno et al. ................... 701/71 |
| 6,005,492 | A | * | 12/1999 | Tamura et al. ............... 340/937 |
| 6,012,367 | A | * | 1/2000 | Westra et al. .................. 83/147 |
| 6,073,065 | A | * | 6/2000 | Brown et al. ................... 701/36 |
| 6,112,147 | A | * | 8/2000 | Ghoneim et al. ............... 701/80 |
| 6,208,927 | B1 | * | 3/2001 | Mine et al. ..................... 701/70 |
| RE37,522 | E | * | 1/2002 | Karnopp et al. .............. 303/146 |
| 6,385,528 | B1 | * | 5/2002 | Takahashi ..................... 701/93 |
| 6,484,086 | B2 | * | 11/2002 | Jeon ............................. 701/93 |
| 6,792,345 | B2 | * | 9/2004 | Matsumoto et al. ........... 701/96 |
| 6,853,902 | B2 | * | 2/2005 | Miller et al. .................. 701/82 |
| 7,062,382 | B2 | * | 6/2006 | Courtenay et al. .......... 701/301 |
| 7,085,639 | B2 | * | 8/2006 | Lu et al. ........................ 701/45 |
| 7,090,616 | B2 | * | 8/2006 | Henneken et al. ............. 477/97 |
| 7,107,137 | B2 | * | 9/2006 | Tange et al. .................... 701/70 |
| 2001/0020217 | A1 | * | 9/2001 | Matsuno ..................... 701/301 |
| 2002/0095246 | A1 | | 7/2002 | Kawazoe |
| 2003/0120414 | A1 | | 6/2003 | Matsumoto et al. |
| 2006/0149448 | A1 | * | 7/2006 | Tange et al. ................... 701/41 |

FOREIGN PATENT DOCUMENTS

| JP | 2000-033860 A | | 2/2000 |
| JP | 200351362 | * | 12/2000 |
| JP | 2003-112540 A | | 4/2003 |
| JP | 2004284485 | * | 10/2004 |

* cited by examiner

*Primary Examiner*—Thomas G Black
*Assistant Examiner*—Lin B Olsen
(74) *Attorney, Agent, or Firm*—Global IP Counselors, LLP

(57) ABSTRACT

A lane departure prevention apparatus is configured to conduct a course correction in a lane departure avoidance direction when the controller determines that there is a potential for a vehicle to depart from a driving lane. The lane departure prevention apparatus has a driving road detecting section and a lane departure avoidance control section. The driving road detecting section is configured to determine at least one of a road slope direction and a road curvature direction of a driving road upon which a host vehicle is traveling. The lane departure avoidance control section is configured to start lane departure avoidance control based on a driving direction of the host vehicle and at least one of a road slope direction and a road curvature direction detected by the driving road detecting section.

19 Claims, 20 Drawing Sheets

(A)

(B)

(A)

(B)

LANE DEPARTURE PREVENTION APPARATUS

BACKGROUND OF THE INVENTION

1. Field of the Invention

The present invention relates to a lane departure prevention apparatus. More specifically, the present invention relates to a lane departure prevention device for preventing a host vehicle from departing from a driving lane when such departure seems imminent.

2. Background Information

Conventional lane departure prevention apparatuses include apparatuses for imparting yaw moment to the host vehicle by controlling the braking force to the wheel and preventing the host vehicle from deviating from the driving lane. These conventional lane departure prevention apparatuses also inform the driver that the host vehicle may possibly depart from the driving-lane by providing this yaw moment in cases in which there is a possibility that the host vehicle may depart from a driving lane. For example, one such lane departure prevention apparatus is disclosed in Japanese Laid-Open Patent Publication No. 2000-33860, which controls the brakes to provide a yaw moment to the host vehicle and prevents lane departure, and which also warns the driver through this yaw moment (see, page 3 and FIG. 6). This conventional lane departure prevention apparatus determines a lane departure by whether or not any of the distance from a driving lane center of a host vehicle driving position (lateral shift amount) and the angle that an estimated driving course forms with respect to the driving lane (yaw angle shift amount) has exceeded respective predetermined values.

Another lane departure prevention apparatus is disclosed in Japanese Laid-Open Patent Publication No. 2003-112540 (p. 7 and FIG. 2), which evaluates the lane departure of the host vehicle from its driving lane, and avoids lane departure by combining yaw control and deceleration control. In particular, the yaw control applies the brakes to provide a yaw moment to the host vehicle in which a braking force difference is applied to the left and right wheels to avoid lane departure, while the deceleration control applies the brakes to decelerate the host vehicle. The total braking force of the yaw control and the deceleration control is applied according to the amount by which the vehicle is estimated to depart from its lane in the future, which is calculated on the basis of the driving state of the host vehicle.

In view of the above, it will be apparent to those skilled in the art from this disclosure that there exists a need for an improved lane departure prevention apparatus. This invention addresses this need in the art as well as other needs, which will become apparent to those skilled in the art from this disclosure.

SUMMARY OF THE INVENTION

It has been discovered that in Japanese Laid-Open Patent Publication No. 2000-33860, a lateral shift detector detects the lateral shift of the vehicle driving position from a driving lane reference position and a braking force is imparted based on the detected lateral shift thereof. This contributes a yaw moment to the vehicle thereby preventing the vehicle from departing from the driving lane. Namely, the proposed lane departure avoidance of Japanese Laid-Open Patent Publication No. 2000-33860 does no more than consider solely the positional relationship between the driving lane and the vehicle and prevent the vehicle from departing therefrom. However, there is a possibility that the driver may feel that something is wrong even though the lane departure prevention control is implemented according to the positional relationship between the driving lane and the vehicle.

In view of the above, the present invention was contrived while taking into consideration the problems described above. One object of the present invention is provide a lane departure prevention apparatus that can implement optimum lane departure prevention control in response to the configuration of the driving lane.

In order to solve some of the above-described problems, the lane departure prevention apparatus of the present invention is provided with a driving road detecting section and a lane departure avoidance control section. The driving road detecting section is configured to determine at least one of a road slope direction and a road curvature direction of a driving road upon which a host vehicle is traveling. The lane departure avoidance control section is configured to start lane departure avoidance control based on a driving direction of the host vehicle and at least one of a road slope direction and a road curvature direction detected by the driving road detecting section.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
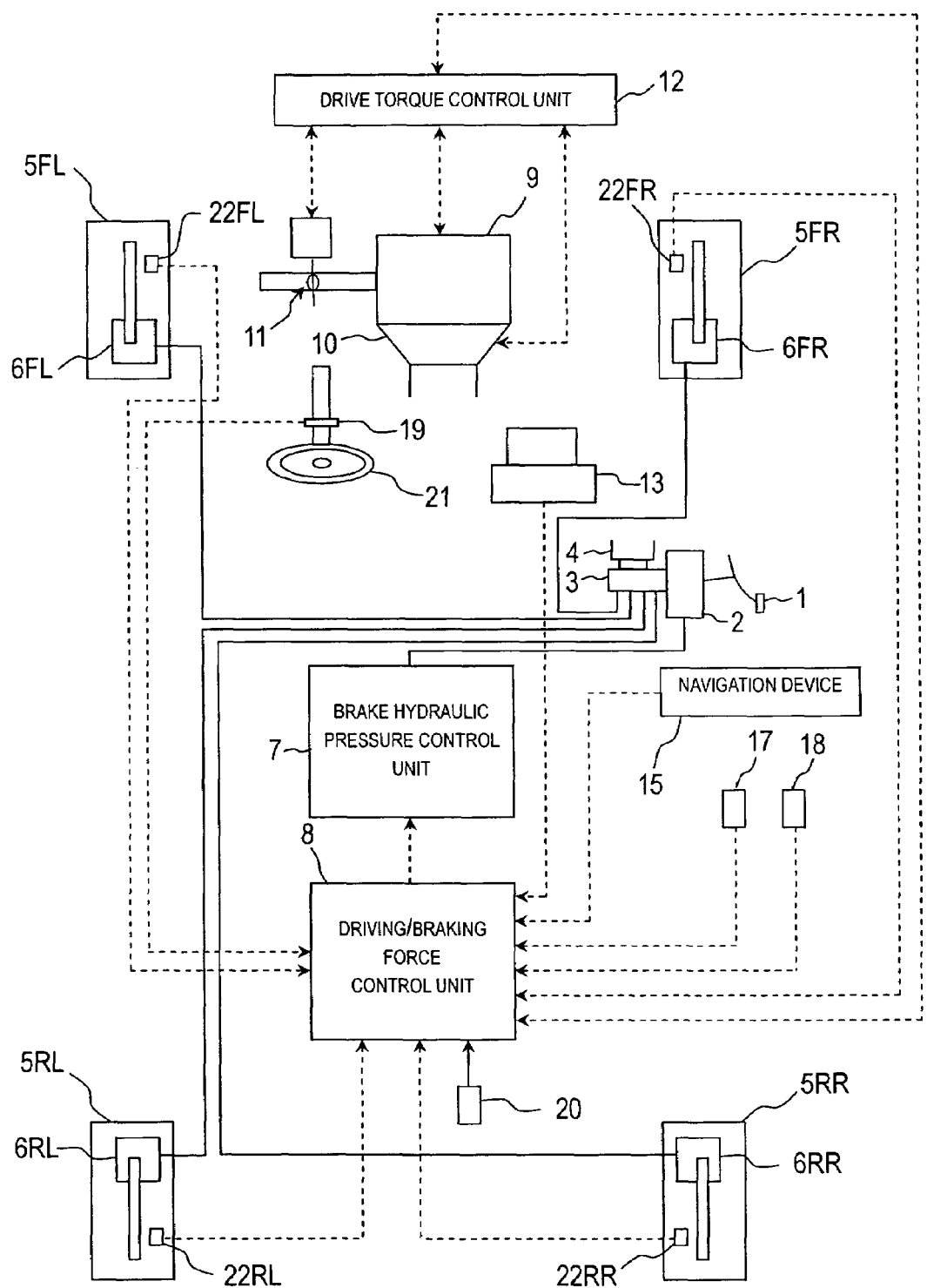
FIG. 1 is a schematic structural diagram of a vehicle equipped with a lane departure prevention apparatus in accordance with a first embodiment of the present invention.

Referring initially to FIG. 1, a schematic structural diagram of a host vehicle is illustrated that is equipped with a lane departure prevention apparatus in accordance with a first embodiment of the present invention. The embodiment is a rear wheel drive vehicle equipped with the lane departure prevention apparatus of the present invention. This rear-wheel-drive vehicle is equipped with an automatic transmission and a conventional differential gear, and with a braking system that allows independent control of braking force at the front and rear wheels and the left and right wheels.

In the diagram of FIG. 1, the host vehicle is basically equipped with a brake pedal 1, a booster 2, a master cylinder 3, a reservoir 4, a pair of front wheels 5FL and 5FR, a pair of rear wheels 5RL and 5RR, a pair of front wheel cylinders 6FL and 6FR, a pair of rear wheel cylinders 6RL and 6RR, a brake hydraulic pressure control unit 7, a controller or driving/braking force control unit 8, an internal combustion engine 9, an automatic transmission 10, a throttle valve 11, a drive torque control unit 12, an imaging unit 13, a navigation device 15, a master cylinder pressure sensor 17, an accelerator depression or throttle aperture opening sensor 17, a torque sensor 18, a steering angle sensor 19, a turn signal switch 20, a steering wheel 21, a pair of front wheel velocity sensors 22FL to 22FR and a pair of rear wheel velocity sensors 22RL to 22RR. This vehicle is also equipped with an alarm device that is preferably an alarm sound output unit. This alarm device is driven by drive signals from the driving/braking control unit 8.

The driving/braking force control unit 8 preferably includes a microcomputer with a lane departure prevention control program that controls the wheel cylinders 6FL, 6FR, 6RL and 6RR to apply a yaw moment to the host vehicle as discussed below. The driving/braking force control unit 8 can also include other conventional components such as an input interface circuit, an output interface circuit, and storage devices such as a ROM (Read Only Memory) device and a RAM (Random Access Memory) device. The memory circuit stores processing results and control programs such as ones for controlling the braking control operations that are run by the processor circuit. The driving/braking force control unit 8 is operatively coupled to the above mentioned sensors in a conventional manner. The internal RAM of the driving/braking force control unit 8 stores statuses of operational flags and various control data. The internal ROM of the driving/braking force control unit 8 stores the programs and predetermined variables for various operations. The driving/braking force control unit 8 is capable of selectively controlling any number of the components of the host vehicle as needed and/or desired. It will be apparent to those skilled in the art from this disclosure that the precise structure and algorithms for the driving/braking force control unit 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The brake hydraulic pressure control unit 7 preferably includes a microcomputer that is preferably configured and arranged, for example, to carry out anti-skid control and traction control. The brake hydraulic pressure control unit 7 is also configured and arranged to independently control the braking hydraulic pressure of the wheel cylinders 6FL to 6RR. Thus, the brake hydraulic pressure control unit 7 is also configured so as to control the brake hydraulic pressure in accordance with a brake hydraulic pressure command value when the brake hydraulic pressure command value is input from the driving/braking force control unit 8 (described below).

The drive torque control unit 12 preferably includes a microcomputer that is configured and arranged to control the drive torque to the rear wheels 5RL and 5RR, which are the drive wheels, by controlling the operating conditions of the engine 9, the selected gear ratio of the automatic transmission 10, and/or the throttle opening of a throttle valve 11. The drive torque control unit 12 controls the fuel injection amount and the ignition timing, and controls the operating condition of the engine 9 by simultaneously controlling the size of the throttle aperture. With this drive torque control unit 12, the value of the drive torque Tw that is used for control is output to the driving/braking force control unit 8.

The drive torque control unit 12 is also configured to independently control the drive torque of the rear wheels 5RL and 5RR. Thus, the drive torque control unit 12 is also configured to control the drive wheel torque in accordance with a drive torque command value when the drive torque command value is input from the driving/braking force control unit 8.

The imaging unit 13 has a picture processing function and preferably includes a CCD (Charge Coupled Device) camera, for example, and a camera controller as object recognition sensors for detecting the position of the host vehicle within a driving lane in order to evaluate the prevention of driving lane departure by the host vehicle. Thus, the imaging unit 13 is designed to detect the position of the host vehicle in the driving lane in order to detect the lane departure tendency of the host vehicle. The imaging unit 13 is configured to pick up an image with a monocular (single-lens) camera composed of a CCD (Charge Coupled Device) camera, for example. The imaging unit 13 is preferably disposed on the front of the host vehicle.

The camera controller of the imaging unit 13 is preferably configured and arranged to detect white lines or other lane markers, for example, from the imaging picture of the area in front of the host vehicle. Thus, the driving lane is detected based on the detected lane markers. Furthermore, the imaging unit 13 calculates the angle (yaw angle) $\phi$ formed by the driving lane of the host vehicle and the longitudinal axis of the host vehicle, the lateral displacement X from the center of the driving lane, the driving lane curvature $\beta$, the lane width L, and so forth. The imaging unit 13 outputs the calculated yaw angle $\phi$, the calculated lateral displacement X, the calculated driving lane curvature $\beta$, the lane width L, and the like to the driving/braking force control unit 8. The imaging unit 13 functions as a running condition detecting section for detecting a running condition of the vehicle. The imaging unit 13 also can be considered a driving road detecting section for detecting a condition of the driving road.

The navigation device 15 is preferably configured and arranged to detect the yaw rate $\phi'$ and the lateral acceleration Xg and/or the longitudinal acceleration Yg generated in the host vehicle. The navigation device 15 outputs the detected lateral acceleration Xg, the detected longitudinal acceleration Yg, and the detected yaw rate $\phi'$ to the driving/braking force control unit 8. The navigation device 15 also outputs road information to the driving/braking force control unit 8. Preferably, the road information (i.e., host vehicle driving environment) includes information about the type of the road, such as the number of lanes and whether the road is an ordinary road or an expressway. The navigation device 15 also functions as a running condition detecting section for detecting a running condition of the vehicle. The navigation device 15 also can be considered a driving road detecting section for detecting a condition of the driving road.

The master cylinder pressure sensor 17 is preferably configured and arranged to detect the output pressure of the master cylinder 3, that is, the master cylinder hydraulic pressures Pmf and Pmr. Thus, the master cylinder pressure sensor 17 functions as a braking operation amount detection section for detecting the output pressure of the master cylinder 3. The accelerator depression or throttle aperture opening sensor 18 is preferably configured and arranged to detect the downward force on the accelerator pedal 1 or the throttle aperture opening size to output a signal indicative of the throttle aperture opening size Acc. The steering angle sensor 19 is preferably configured and arranged to detect the steering angle $\delta$ of the steering wheel 21. The turn signal switch 20 is preferably configured and arranged to detect turn signal operation of a turn signal indicator. The wheel velocity sensors 22FL to 22RR are preferably configured and arranged to detect the rotational velocity of the wheels 5FL to 5RR, that is, the so-called wheel velocity Vwi (i=fl, fr, rl, rr).

When there is left or right directionality in the detected driving condition or state data of the host vehicle, the two directions are set such that the left direction is the positive direction. In other words, the yaw rate $\phi'$, the longitudinal acceleration Yg, and the yaw angle $\phi$ are positive values when turning left, and the lateral displacement X is a positive value when shifting from the center of the driving lane to the left. Also, the longitudinal acceleration Yg is a positive value during acceleration, and is a negative value during deceleration.

Next, a computational processing procedure performed by the driving/braking force control unit 8 for avoiding lane departure will now be described below with reference to FIG. 2. This computational processing is executed by using a timer interrupt at each specific predetermined sampling time interval $\Delta T$, such as every 10 msec for example. Communication processing is not included in the processing shown in FIG. 2, but the information obtained by computational processing is updated and stored in random access memory, and required information is read out from the random access memory when required.

First, in step SI, various kinds of data are read from the above-described sensors, by the driving/braking force control unit 8. More specifically, the following types of data are read: the lateral acceleration Xg, the longitudinal acceleration Yg, the yaw rate $\phi'$, and the road information obtained by the navigation device 15; the wheel velocity Vwi; the steering angle $\delta$, the accelerator depression amount or throttle opening aperture size Acc; the master cylinder hydraulic pressures Pmf and Pmr; the turn switch signal WS from the turn signal switch 20; the signal for the hazard switch 31; the drive torque Tw from the drive torque control unit 12; and the yaw angle $\phi$, the lateral displacement X, and the driving lane curvature $\beta$ from the imaging unit 13.

The host vehicle velocity V is calculated in step S2. More specifically, the host vehicle velocity V is calculated using Equation (1) as shown below, based on the wheel velocity Vwi read in the above-described step S1.

Next, the processing moves to step S2 where, the host vehicle velocity V is calculated based on the average value of the wheel velocities of the non-driven wheels. In the illustrated embodiment, the host vehicle is driven by the rear wheels, so the host vehicle velocity V is calculated based on the velocities $Vw_{FL}$ and $Vw_{FR}$ of the front left and right wheels 5FL and 5FR. In any case, the host vehicle velocity V is calculated using one of the Equations (1) as shown below, based on the wheel velocity Vwi of the non-driven wheels that was read in the above-described step S1.

$V=(Vwrl+Vwrr)/2$ for front wheel drive, and $V=(Vwfl+Vwfr)/2$ for rear wheel drive (1)

In Equation (1), the terms Vwfl and Vwfr are the respective wheel velocities of the left and right front wheels, and the terms Vwrl and Vwrr are the respective wheel velocities of the left and right rear wheels. In other words, in Equation (1), the host vehicle velocity V is calculated as the average value of the wheel speed of the driven wheels. In the present embodiment, the host vehicle is driven by the rear wheels, so the host vehicle velocity is calculated from the latter equation, i.e., based on the wheel velocity of the front wheels 5FL and 5FR.

Also, the host vehicle velocity V calculated in this manner is preferably used during normal driving. In other words, when the ABS (Anti-lock Brake System) control or the like is operating, for example, the estimated car body velocity that is estimated in the ABS control is used as the above-described vehicle velocity V. The value being used for the navigation information in the navigation device 15 can also be used as the above-described vehicle velocity V.

Figure 3:
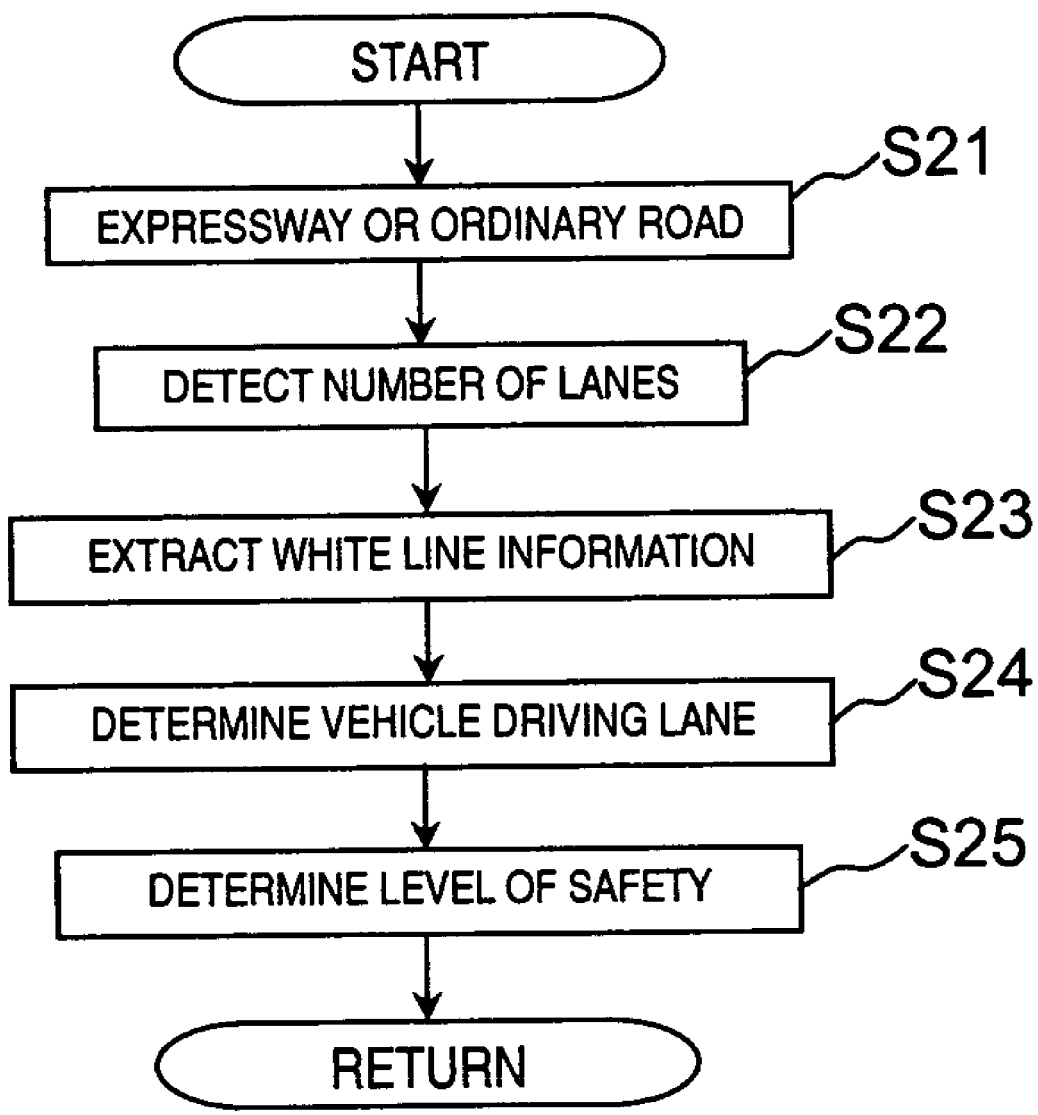
FIG. 3 is a flowchart showing the driving environment determination processing executed by the driving/braking force control unit in the lane departure prevention control processing of FIG. 2 in accordance with the first embodiment of the present invention.

The host vehicle driving environment is then determined in step S3. More specifically, the type of road on which the host vehicle is traveling and the driving lane of the host vehicle are detected as the driving environment. The direction based on the level of safety is then determined from the detected results. The determination is made based on the video information from the imaging unit 13 and on the road information from the navigation device 15. In other words, the determination of the driving environment is made based on the number of lanes and the road-type information that indicates whether the road is an ordinary road or an expressway. FIG. 3 shows the specific processing procedure for determining the driving environment.

First, in step S21, the type of road (ordinary road or expressway) currently being traveled is acquired from the road information provided by the navigation device 15. Furthermore, in step S22, the number of lanes of the road currently being traveled is acquired from the road information provided by the navigation device 15.

Figure 4:
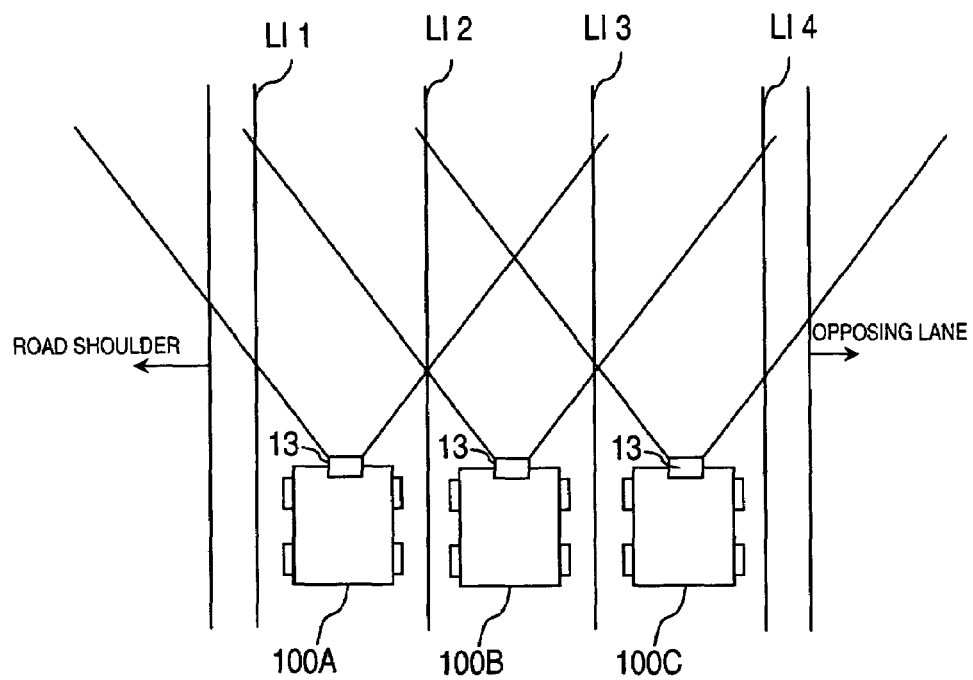
FIG. 4 is a diagram showing vehicles traveling on a three-lane, one-way road.

In the subsequent step S23 the white line portion (lane-dividing line portion) is extracted from the imaging picture taken by the imaging unit 13. Here, an example is described for the case in which the host vehicle is traveling along a three-lane, one-way road, as shown in FIG. 4. The road, by being partitioned from the left-hand side by first to fourth white lines LI 1, LI 2, LI 3, and LI 4, is configured as a three-lane, one-way road, as shown in FIG. 4. When the host vehicle is traveling along such a road, the imaging picture obtained for each lane is different. Furthermore, a picture composed of white lines extracted from the picture also differs in accordance with the driving lane.

Figure 5:
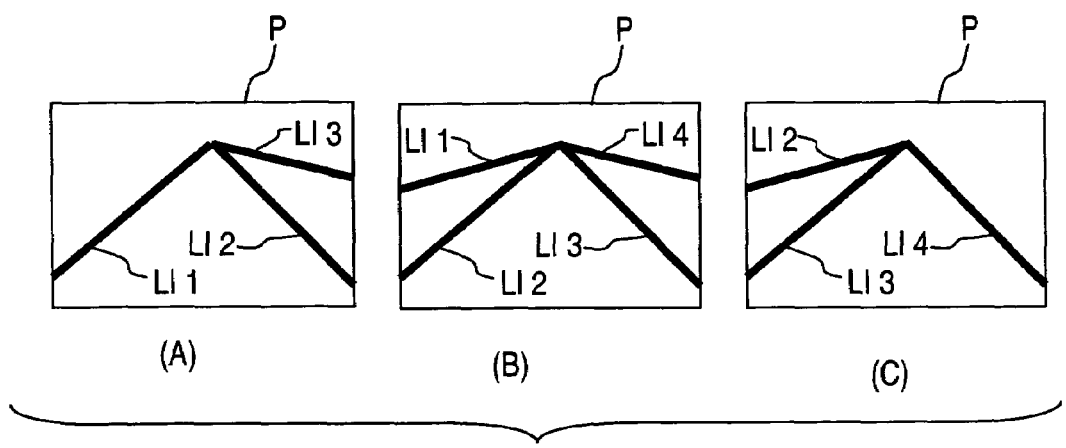
FIG. 5 is a diagram showing the imaging picture taken by the host vehicle in each lane position when the host vehicle is traveling on the three-lane, one-way road.

In other words, when the host vehicle 100A is traveling in the left-hand lane in the traveling direction, the imaging picture P taken by the imaging unit 13 of the host vehicle 100A is a unique picture mainly comprising first, second, and third white lines Ll1, Ll2, and Ll3, as shown in picture (A) of FIG. 5. Also, when the host vehicle 100B is traveling in the center lane, the imaging picture P taken by the imaging unit 13 of the host vehicle 100B is a unique picture mainly comprising first, second, third, and fourth white lines Ll1, Ll2, Ll3, and Ll4, as shown in picture (B) of FIG. 5. When the host vehicle 100C is traveling in the right-hand lane in the traveling direction, the imaging picture P taken by the imaging unit 13 of the host vehicle 100C is a unique picture mainly comprising second, third, and fourth white lines LI 2, LI 3, and LI 4, as shown in picture (C) of FIG. 5. Thus, the configuration of the white lines in the picture differs in accordance with the driving lane.

The host vehicle driving lane is determined in the subsequent step S24. More specifically, the host vehicle driving lane is determined based on the information obtained in steps S22 and S23. In other words, the host vehicle driving lane is determined based on the number of lanes in the road currently being traveled by the host vehicle and the imaging picture (picture with the white lines extracted) taken by the imaging unit 13. For example, the picture obtained in accordance with the number of lanes and the driving lane is stored in advance as picture data, the picture data prepared in advance is compared with the number of lanes in the road currently being traveled by the host vehicle and the current imaging picture (picture with the white lines extracted) taken by the imaging unit 13, and the host vehicle driving lane is determined.

The level of safety in the transverse direction viewed from the lane in which the host vehicle is driving is determined in the subsequent step S25. More specifically, the direction in which the level of safety is low is stored as information when the host vehicle has departed from the lane. Therefore, when the level of safety is low in the left-hand direction, as viewed from lane in which the host vehicle is traveling, this direction is stored as the direction (hereinafter referred to as "the obstacle-containing direction") $S_{out}$ in which the level of safety is low ($S_{out}$=left). When the level of safety is low in the right-hand direction, as viewed from lane in which the host vehicle is traveling, this direction is stored as the obstacle-containing direction $S_{out}$ ($S_{out}$=right). This is determined as follows, for example.

In FIG. 4, for example, when the host vehicle 100A is traveling in the left-hand lane, the level of safety is lower when the host vehicle departs in the left-hand direction from the left-hand lane than when the host vehicle departs in the right-hand direction from the left-hand lane. This is because the road shoulder is in the left-hand direction from the left-hand lane, and there is a high possibility that the road shoulder is a wall, guardrail, obstacle, or cliff something similar will be present on the road shoulder. This means that when the lane departure is to the left from the left lane, that is, toward the shoulder, there is a higher probability that the host vehicle 100A and these objects will come into contact, etc. Hence, when the host vehicle 100A is traveling in the left-hand lane, it is determined that the left-hand direction is the obstacle-containing direction $S_{out}$ ($S_{out}$=left).

When the host vehicle 100B is traveling in the center lane, the level of safety is the same in both the left and right directions with respect to the current driving lane because the host vehicle 100B would still be on the road were departure to occur in either direction.

When the host vehicle 100C is traveling in the right-hand lane, the level of safety is lower when the host vehicle departs in the right-hand direction, to the opposing lane than when the host vehicle departs in the left-hand direction to the neighboring lane. Hence, in this case, when the host vehicle 100C is traveling in the right-hand lane, it is determined that the right-hand direction is the obstacle-containing direction $S_{out}$ ($S_{out}$=right).

In comparison with expressways, ordinary roads have a narrower road shoulder width, there are many obstacles on the road shoulder, and pedestrians are also present. For this reason, the level of safety is lower for departure toward the road shoulder on an ordinary road than when the host vehicle departs toward the road shoulder on an expressway.

Comparing the number of lanes, the level of safety is lower when the left-hand direction is the road shoulder, and one side of the road is a single lane in which the right-hand direction is the opposing lane. In this case, it is determined that both the left and right directions are an obstacle-containing direction $S_{out}$ ($S_{out}$=both).

Most two-lane, two-way roads, for example, do not have a median strip, a guardrail or another divider, so the imaging picture when the host vehicle is traveling on the two-lane, two-way road is one such as that shown in the picture (A) of FIG. 5 for countries that drive on the left side of the road and such as that shown in the picture (C) of FIG. 5 for countries that drive on the right side of the road. In other words, the imaging picture when the host vehicle is traveling on a two-lane, two-way road is the same imaging picture taken by the imaging unit 13 of the host vehicle 100A traveling in the left-hand lane of a three-lane (one-way) road for countries that drive on the left side of the road. Hence, assuming that both ordinary roads and expressways are traveled, the obstacle-containing direction $S_{out}$ cannot be determined solely by using an imaging picture. Based on this fact, the number of lanes in the road on which the host vehicle is currently traveling is obtained from the navigation device 15, and by making a determination as to whether the road currently being traveled is two-lane, two-way road or a three-lane, one-way road, it can be determined that the level of safety is low in the right-hand direction as well when a two-lane, two-way road is being traveled.

Figure 2:
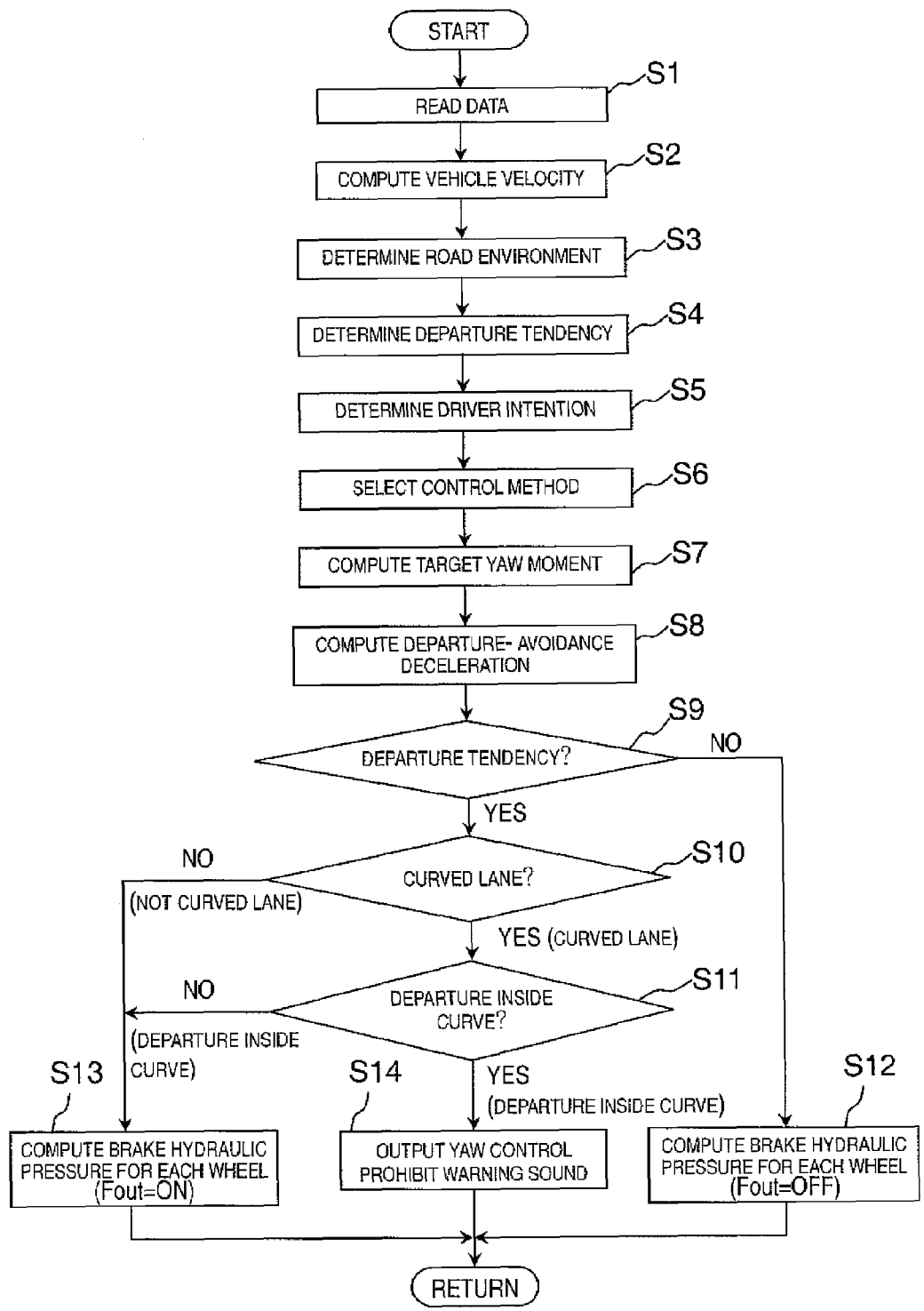
FIG. 2 is a flowchart showing the processing content executed by a driving/braking force control unit as a component of the lane departure prevention apparatus of FIG. 1 in accordance with the first embodiment of the present invention.

The evaluation of the driving environment in step S3 shown in FIG. 2 is performed with the processing procedure shown in FIG. 3 described above.

Figure 6:
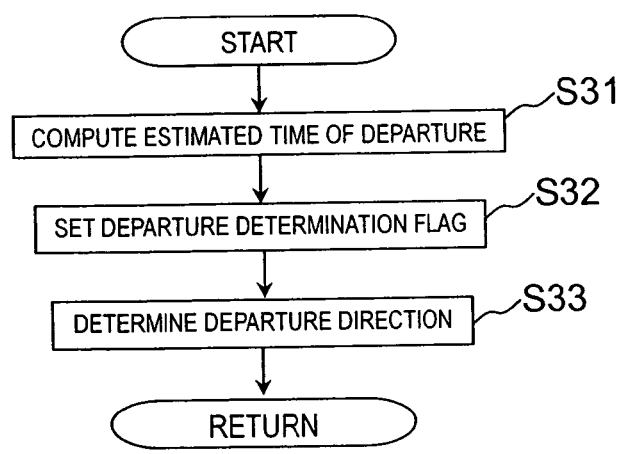
FIG. 6 is a flowchart showing the processing content for determining the lane departure tendency by the driving/braking force control unit.

The lane departure tendency is then determined in step S4. The processing procedure for this determination is specifically shown in FIG. 6.

First, the estimated time of departure $T_{out}$ is calculated in step S3 1. More specifically, the estimated time of departure $T_{out}$ is calculated with Equation (2) shown below by designating dx as the amount of variation (amount of variation per unit time) of the lateral displacement X, designating L as the lane width, and using the lateral displacement X (see, FIG. 7 for the values of X, dx, and L).

$$T_{out}=(L/2-X)/dx \quad (2)$$

The estimated time of departure $T_{out}$ until the host vehicle 100 laterally displaced by an amount equal to the lateral displacement X from the center of the lane (X=0) arrives at an externally positioned area (road shoulder, for example) separated by an amount equal to the distance L/2 from the center of the lane can be computed with Equation (2). The lane width L is obtained from the imaging picture processed by the imaging unit 13. The position of the host vehicle can also be obtained from the navigation device 15, and the lane width L can be obtained from the map data stored in the navigation device 15.

The lane departure determination flag is set in the subsequent step S32. More specifically, the estimated time of departure $T_{out}$ is compared with a predetermined first departure-determining threshold Ts. Here, when the host vehicle moves away from the center of the lane and when the estimated time of departure $T_{out}$ is less than the first departure-determining threshold Ts ($T_{out}$<Ts), the lane departure determination flag $F_{out}$ is switched ON ($F_{out}$=ON) by the processing of step S32. In other words, it is determined that lane departure will occur (lane departure tendency exists), and the lane departure determination flag $F_{out}$ is set to ON ($F_{out}$=ON). When the host vehicle is in a state in which $F_{out}$=ON and returns to the center side of the lane, then the estimated time of departure $T_{out}$ is equal to or greater than the first departure-determining threshold Ts ($T_{out}$≧Ts), and the lane departure determination flag $F_{out}$ is switched OFF ($F_{out}$=OFF). In other words, it is determined that departure will not occur (departure tendency does not exist) when the estimated time of departure $T_{out}$ is equal to or greater than the first departure-determining threshold Ts ($T_{out}$≧Ts). When a lane departure tendency exists and, for example, if braking control (described hereinafter) is performed for avoiding lane departure, or if the driver himself takes evasive actions, then the lane departure determination flag $F_{out}$ is switched from ON to OFF.

The first departure-determining threshold Ts is variable. In other words, the first departure-determining threshold Ts can also be set, for example, based on the level of safety obtained in step S3.

The lane departure direction $D_{out}$ is subsequently determined based on the lateral displacement X in the step S33. More specifically, when the host vehicle is laterally displaced from the center of the lane in the left-hand direction, then that direction is set as the lane departure direction $D_{out}$ ($D_{out}$=left). When the host vehicle is laterally displaced from the center of the lane in the right-hand direction, then that direction is set as the lane departure direction $D_{out}$ ($D_{out}$=right).

The lane departure tendency is determined in step S4 as discussed above.

The intention of the driver to change lanes is determined in the subsequent step S5. More specifically, the intention of the driver to change lanes is determined as follows based on the steering angle δ and/or the turn switch signal obtained in step S1.

When the direction indicated by the turn switch signal (lighted blinker side) and the direction indicated by departure direction $D_{out}$ obtained in step S4 are the same, it is determined that the driver is intentionally changing lanes, and the lane departure determination flag $F_{out}$ is changed to OFF ($F_{out}$=OFF). That is, the determination result is changed to indicate that no departure is imminent.

When the direction (lighted blinker side) indicated by the turn switch signal and the direction indicated by the lane departure direction $D_{out}$ obtained in step S4 are the same, it is determined that the driver is intentionally changing lanes, and the lane departure determination flag $F_{out}$ is changed to OFF ($F_{out}$=OFF). In other words, the determination result is changed, indicating that departure will not occur or no departure is imminent.

When the direction (lighted blinker side) indicated by the turn switch signal and the direction indicated by departure direction $D_{out}$ obtained in step S4 are different, the lane departure determination flag $F_{out}$ is maintained, and the lane departure determination flag $F_{out}$ is left ON ($F_{out}$=ON). In other words, the determination result is maintained, indicating that departure will occur or is imminent.

When the turn signal switch 20 has not been operated, the driver intention to change lanes is determined based on the steering angle δ. In other words, in the case that the driver steers in the lane departure direction, it is determined that the driver is intentionally changing lanes when the steering angle δ and the amount of variation Δδ (amount of variation per unit time) in the steering angle are equal to or greater than a set value, and the lane departure determination flag $F_{out}$ is changed to OFF ($F_{out}$=OFF).

The control method for departure avoidance is determined in the subsequent step S6. In other words, a braking control method is determined when controlling the braking of the lane departure avoidance whether or not there is a departure warning or braking control for departure avoidance is implemented. More specifically, a determination is made as to whether or not to issue a lane departure alarm and/or to perform departure-avoiding braking control. The braking control method is selected when the lane departure-avoiding braking control is performed.

The control content for departure avoidance is determined here based on the obstacle-containing direction $S_{out}$ obtained in step S3, the lane departure direction $D_{out}$ obtained on step S4, and the lane departure determination flag $F_{out}$ obtained in step S5. For example, when the lane departure determination flag $F_{out}$ is left ON ($T_{out}$<Ts), a departure warning is issued. For example, the warning can be a sound or a display. In addition, when the lane departure determination flag $F_{out}$ is left ON ($T_{out}$<Ts), the braking control method for departure avoidance is determined based on the obstacle-containing direction $S_{out}$ and the lane departure direction $D_{out}$. This will be described later.

For instance, a lane departure alarm or warning is actuated if the lane departure determination flag $F_{out}$ is ON ($T_{out}$<Ts) when it can be determined that lane departure can be prevented by the driver performing a steering operation or the like. In other words, a warning is sounded from the alarm device 31, for example, in accordance with the ON and OFF state of the lane departure determination flag $F_{out}$ obtained in step S5. The alarm or warning is performed by sound, a display, or the like. If the lane departure determination flag $F_{out}$ is ON ($T_{out}$<Ts), the control method to be used for departure avoidance is decided on the basis of the longitudinal acceleration Yg, the first obstacle-containing direction $S_{out}$, and the lane departure direction $D_{out}$. This is discussed in detail below.

As described herein, situations exist in which the lane departure determination flag $F_{out}$ is ON ($T_{out}$<Ts) but it can nevertheless be determined that lane departure can be prevented by the driver performing a steering operation or the like. For example, those situations include ones in which the driver himself realizes the lane departure tendency of the host vehicle, and then takes evasive actions, but the lane departure determination flag $F_{out}$ itself is still ON ($T_{out}$<Ts).

In the case that the lane departure determination flag $F_{out}$ is ON ($T_{out}$<Ts), the braking control method is also selected based on the obstacle-containing direction $S_{out}$ obtained in step S3 and the lane departure direction $D_{out}$ obtained in step S4. The procedure is described in detail hereinafter. The processing of steps S2 to S6 corresponds to a lane departure avoidance control section.

The target yaw moment generated in the host vehicle is calculated in the subsequent step S7. This target yaw moment is a yaw moment imparted to the host vehicle for departure avoidance. More specifically, the target yaw moment Ms is calculated with Equation (3) below based on the amount of variation dx and the lateral displacement X obtained in step S1.

$$Ms = K1 \cdot X + K2 \cdot dx \quad (3)$$

Figure 8:
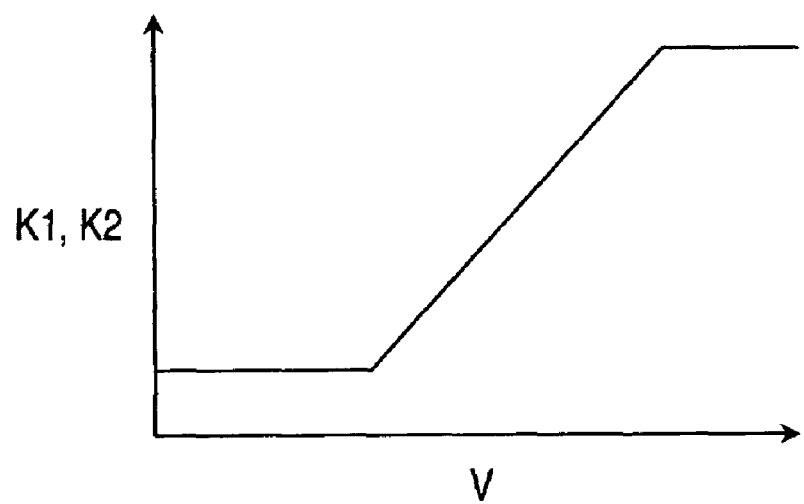
FIG. 8 is a characteristics diagram or map showing the characteristics of gains K1 and K2 that are used for calculating the yaw moment Ms.

In Equation (3), the terms K1 and K2 are the gains that vary or fluctuate in accordance with the host vehicle velocity V. For example, in FIG. 8, the gains K1 and K2 have lower values at low speeds, increase in a corresponding relationship with the host vehicle velocity V when the host vehicle velocity V reaches a certain value, and remain constant thereafter when a certain vehicle velocity V is reached.

The lane departure-avoiding deceleration is calculated in the subsequent step S8. In other words, the braking force applied to both the left and right wheels is calculated with the aim of decelerating the host vehicle. Here, such a braking force is calculated as target brake hydraulic pressures Pgf and Pgr applied to both the left and right wheels. The target brake hydraulic pressure Pgf for the front wheels is calculated with Equation (4) below.

$$Pgf = Kgv \cdot V + Kgx \cdot dx \quad (4)$$

Figure 9:
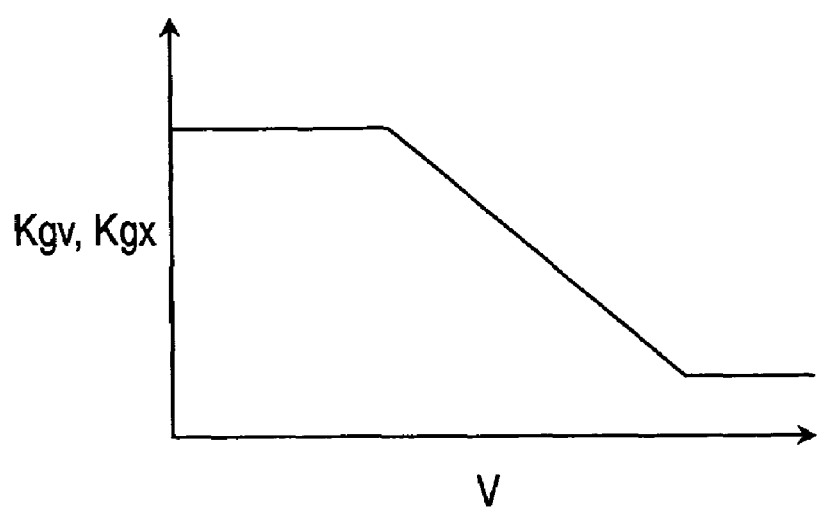
FIG. 9 is a characteristics diagram or map showing the characteristics of conversion factors Kgv and Kgx that are used for calculating the target brake hydraulic pressure Pgf.

In Equation (4), the terms Kgv and Kgx are conversion factors for converting the braking force into brake hydraulic pressure. The conversion factors Kgv and Kgx are respectively set based on the host vehicle velocity V and the amount of variation dx. For example, in FIG. 9 the conversion factors Kgv and Kgx have higher values at low speeds, decrease in a corresponding relationship with the host vehicle velocity V when the host vehicle velocity V reaches a certain value, and remain constant thereafter when a certain vehicle velocity V is reached.

The target brake hydraulic pressure Pgr is calculated for the rear wheels based on the target brake hydraulic pressure Pgf for the front wheels while taking the front and rear braking distribution into consideration.

The deceleration (more specifically, the target brake hydraulic pressure Pgf and Pgr) for departure avoidance is obtained in this manner in step S8.

The target brake hydraulic pressure Pgr is calculated for the rear wheels based on the target brake hydraulic pressure Pgf for the front wheels while taking the front and rear braking distribution into consideration.

The deceleration (more specifically, the target brake hydraulic pressure Pgf and Pgr) for departure avoidance is obtained in this manner in step S8.

Whether or not there is lane departure tendency is determined in subsequent step S9. In other words, the lane departure determination flag $F_{out}$ determines whether or not there is lane departure tendency. When the lane departure determination flag $F_{out}$ is left ON, the processing advances to step S10 as a tendency for the host vehicle to depart from the lane and when the lane departure determination flag $F_{out}$ is left OFF, the processing advances to step S12 as a tendency for the host vehicle to not depart from the lane.

Whether the lane the host vehicle is traveling on is a straight lane or a curved lane is determined in subsequent step S10. More specifically, the driving lane curve rate β read in step S1 and the curved lane determination threshold value βcur are compared to determine whether the lane the host vehicle is currently traveling on is a straight lane or a curved lane. When the driving lane curve rate β is larger than the curved lane determination threshold value βcur here (β>βcur), the current driving lane is determined to be a curved lane and the processing advances to step S11. For this case, the curved lane inside determination flag Fcurin is ON (Fcurin=ON). Information concerning the direction the curved lane curves is also obtained. In contrast, when the driving lane curve rate β is equal to or less than the curved lane determination threshold value βcur (β<=βcur), the current driving lane is determined to be a straight lane and the processing advances to step S13.

Whether or not the lane departure direction is towards the inside direction of the curved lane is determined in step S11. More specifically, whether or not the lane departure direction is towards the inside direction of the curved lane is determined in step S11 based on the lane departure direction $D_{out}$ obtained in step S4 and the direction the curved lane curves. At this point, if step S11 determines that the lane departure direction is the inside direction of the curved lane when the lane departure direction $D_{out}$ is the same direction as the direction the curved lane curves, the processing advances to step S14. If step S11 determines that the lane departure direction is towards the outside direction of the curved lane when the lane departure direction $D_{out}$ is opposite to the direction the curved lane curves, the processing advances to step S13.

The target brake hydraulic pressure for each wheel is calculated in the steps S12 and S13. In other words, the final brake hydraulic pressure is calculated based on the presence of departure-avoiding braking control. More specifically, the calculation is performed in the following manner.

First, in step S12, if the lane departure determination flag $F_{out}$ is OFF ($F_{out}$=OFF), i.e., when it is determined that departure will not occur, then the target brake hydraulic pressure Psi (i=fl, fr, rl, rr) for each wheel is set as the master cylinder hydraulic pressure Pmf or Pmr, as shown in Equations (5) and (6) below.

$$Psfl=Psfr=Pmf \qquad (5)$$

$$Psrl=Psrr=Pmr \qquad (6)$$

In Equations (5) and (6), the term Pmf is the master cylinder hydraulic pressure for the front wheels, while the term Pmr is the master cylinder hydraulic pressure for the rear wheels. The rear wheel master cylinder hydraulic pressure Pmr is a value calculated based on the master cylinder hydraulic pressure Pmf for the front wheels while taking the front and rear braking distribution into consideration.

In step S13, when the lane departure determination flag $F_{out}$ is ON ($F_{out}$=ON), i.e., when it is determined that lane departure will occur, the front wheel target brake hydraulic pressure difference ΔPsf and the rear wheel target brake hydraulic pressure difference ΔPsr are first calculated based on the target yaw moment Ms. More specifically, the target brake hydraulic pressure differences ΔPsf and ΔPsr are calculated with Equations (7) to (10) below.

When Ms<Ms1, then $$\Delta Psf=0 \qquad (7)$$

$$\Delta Psr=2\cdot Kbr\cdot Ms/T \qquad (8)$$

When Ms>Ms1, then $$\Delta Psf=2\cdot Kbf\cdot(Ms-Ms1)/T \qquad (9)$$

$$\Delta Psr=2\cdot Kbr\cdot Ms1/T \qquad (10)$$

In Equations (7) to (10), the term Ms1 is the threshold used for setting purposes, while the term T is the tread. The tread T is the same value for simplicity. The terms Kbf, and Kbr are conversion factors for the front and rear wheels when the braking force is converted to brake hydraulic pressure, and are set according to brake parameters or specifications.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference ΔPsf is set to 0, a predetermined value is assigned to the rear wheel target brake hydraulic pressure difference ΔPsr, and the braking force difference is generated in the left and right rear wheels. When the target yaw moment Ms is equal to or greater than the threshold Ms1 used for setting purposes, a predetermined value is assigned to the target brake hydraulic force differences ΔPsf and ΔPsr, and the braking force difference is generated in the front and rear left and right wheels.

When the lane departure determination flag $F_{out}$ is ON ($F_{out}$=ON), the final target brake hydraulic pressure Psi (i=,fl, fr, rl, rr) for each wheel is calculated using the target brake hydraulic pressure differences ΔPsf and ΔPsr and the target brake hydraulic pressures Pgf and Pgr calculated as described above. More specifically, the final target brake hydraulic pressure Psi (i=fl, fr, rl, rr) for each wheel is calculated based on the braking control method selected in step S6.

In step S6, when the lane departure determination flag $F_{out}$ is ON, the braking control method is selected based on the obstacle-containing direction $S_{out}$ and the lane departure direction $D_{out}$. First, the braking control method selected based on the obstacle-containing direction $S_{out}$ and the lane departure direction $D_{out}$ when the lane departure determination flag $F_{out}$ is ON will be described below for various relationships between the obstacle-containing direction $S_{out}$ and the lane departure direction $D_{out}$ (first to third cases or scenarios).

First Scenario

In the first scenario or case, when the obstacle-containing direction $S_{out}$ and the lane departure direction $D_{out}$ do not match, the braking control (hereinafter referred to as "departure-avoiding yaw control") is carried out so that a yaw moment is imparted to the host vehicle for avoiding departure until the lane departure determination flag $F_{out}$ is OFF.

Here, the magnitude of the yaw moment imparted to the host vehicle in order to avoid departure is the target yaw moment Ms. The yaw moment is imparted to the host vehicle by creating a difference in the braking force applied to the left and right wheels. More specifically, when the target yaw moment Ms is less than the threshold Ms1 used for setting purposes, a braking force difference is generated in the left and right rear wheels to impart the target yaw moment Ms to the host vehicle. When the target yaw moment Ms is equal to or greater than the threshold Ms1 used for setting purposes, a braking force difference is generated in the front and rear left and right wheels to impart the target yaw moment Ms to the host vehicle, as described above.

The lane departure determination flag $F_{out}$ is switched from ON to OFF in cases in which departure-avoiding braking control has been carried out or the driver himself has taken evasive actions when there is a lane departure tendency.

Second Scenario

In the second scenario or case, when there is a match between the obstacle-containing direction $S_{out}$ and the lane departure direction $D_{out}$, and the road type R obtained in step S3 is an ordinary road, the lane departure-avoiding yaw control is carried out until the lane departure determination flag $F_{out}$ is OFF.

Furthermore, the second departure-determining threshold Tr, which is less than the first departure-determining threshold Ts (Ts>Tr>0), is defined. When the estimated time of departure $T_{out}$ becomes less than the second departure-determining threshold Tr ($T_{out}$<Tr), the lane departure-avoiding yaw control is applied, and the braking control for decelerating the host vehicle (hereinafter referred to as "departure-avoiding deceleration control") is carried out. The lane departure-avoiding deceleration control is carried out so as to provide substantially equal braking force to both the left and right wheels.

Here, the estimated time of departure $T_{out}$ is an indicator of the magnitude of the lane departure tendency, so an estimated time of departure that is less than the second departure-determining threshold Tr corresponds to the lane departure tendency being greater than the second threshold.

Third Scenario

In the third scenario or case, when there is a match between the obstacle-containing direction $S_{out}$ and the lane departure direction $D_{out}$, and the road type R obtained in step S3 is an expressway, the lane departure-avoiding yaw control is carried out until the lane departure determination flag $F_{out}$ is OFF.

Furthermore, in this third case, when the estimated time of departure $T_{out}$ has reached 0, the lane departure-avoiding yaw control is applied, and the lane departure-avoiding deceleration control is carried out.

In the third case, the lane departure-avoiding deceleration control can also be carried out when the estimated time of departure $T_{out}$ has become less than the second departure-determining threshold Tr, in the same manner as in the second case. In this case, when the estimated time of departure $T_{out}$ becomes 0, for example, the deceleration of the host vehicle is increased by departure-avoiding deceleration control. Therefore, the lane departure-avoiding deceleration control is configured so as to be actuated when the estimated time of departure $T_{out}$ has become less than the second departure-determining threshold Tr, and when the estimated time of departure $T_{out}$ becomes 0. When the estimated time of departure $T_{out}$ becomes 0 in this case, the deceleration of the host vehicle is further increased.

The braking control methods are selected in step S6 in accordance with the obstacle-containing direction $S_{out}$ and the lane departure direction $D_{out}$ in this manner. In other words, the braking control method for departure avoidance is selected by departure-avoiding yaw control alone or by a combination of the lane departure-avoiding yaw control and the lane departure-avoiding deceleration control in accordance with the obstacle-containing direction $S_{out}$ and the lane departure direction $D_{out}$, and/or in accordance with the host vehicle velocity V and the estimated time of departure $T_{out}$.

The target brake hydraulic pressure Psi (i=fl, fr, rl, rr) for each wheel is calculated in step S13 in accordance with each type of braking control method.

In the lane departure-avoiding yaw control for the first to third cases, for example, the target brake hydraulic pressure Psi (i=fl, fr, rl, rr) for each wheel is calculated with Equations (11) below.

$$Psfl=Pmf$$

$$Psfr=Pmf+\Delta Psf$$

$$Psrl=Pmr$$

$$Psrr=Pmr+\Delta Psr \quad (11)$$

The lane departure-avoiding yaw control and the lane departure-avoiding deceleration control are carried out in the second and third cases, but in this case the target brake hydraulic pressure Psi (i=fl, fr, rl, rr) for each wheel is calculated with Equations (12) below.

$$Psfl=Pmf+Pgf/2$$

$$Psfr=Pmf+\Delta Psf+Pgf/2$$

$$Psrl=Pmr+Pgr/2$$

$$Psrr=Pmr+\Delta Psr+Pgr/2 \quad (12)$$

Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

The above describes the processing for step S13. Thus, the target brake hydraulic pressure Psi (i=fl, fr, rl, rr) for each wheel is calculated based on the state of the lane departure determination flag $F_{out}$ in this step S12 or the above-mentioned step S13. When the lane departure determination flag $F_{out}$ is ON, the target brake hydraulic pressure Psi (i=fl, fr, rl, rr) for each wheel is calculated in accordance with the braking control method selected in step S6 in response to the relationship between the first obstacle-containing direction $S_{out}$ and the value of the lane departure direction $D_{out}$.

In the description above, the calculations are processed by the driving/braking force control unit 8. The driving/braking force control unit 8 outputs the target brake hydraulic pressure Psi (i=fl, fr, rl, rr) for each wheel calculated in step S12 or step S13 to the brake hydraulic pressure control unit 7 as a brake hydraulic pressure command value.

Departure-avoidance yaw control as implemented in step S13 is prohibited in step S14. In other words, only the deceleration control for departure avoidance is implemented in response to the lane departure tendency. At this time, a warning sound outputs to notify the driver of the intent to prohibit the lane departure-avoidance yaw control.

The lane departure prevention apparatus described above operates according to the following overview.

First, various kinds of data are read from the sensors, the controllers, and the control units (step S1). Next, the vehicle speed V is then calculated (step S2).

The driving environment is then evaluated and the direction in which the safety level is relatively lowest (first obstacle-containing direction $S_{out}$) is determined (step S3, FIG. 3). For example, if the host vehicle 100A is traveling in the left lane in FIG. 4, the obstacle-containing direction $S_{out}$ is used as the left-hand direction.

Figure 7:
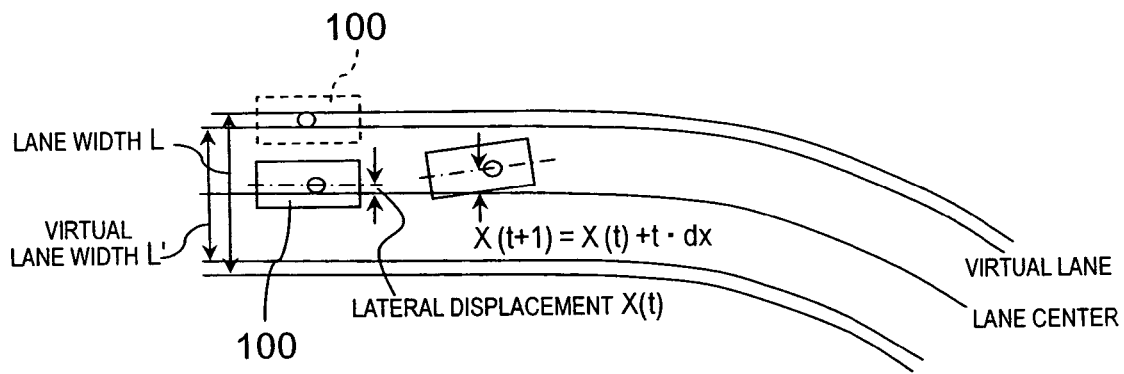
FIG. 7 is a diagram used for describing the anticipated or estimated time of departure $T_{out}$.

In step S4, the lane departure determination flag $F_{out}$ is set based on the estimated time of departure $T_{out}$, and the lane departure direction $D_{out}$ is determined based on the lateral displacement X (see FIG. 7).

Furthermore, the driver's intention to change lanes is determined based on the lane departure direction $D_{out}$ obtained in this manner and/or on the direction (lighted blinker side) indicated by the turn signal switch 20 (step S5).

For example, when the direction (lighted blinker side) indicated by the turn switch signal and the direction indicated by the lane departure direction $D_{out}$ are the same, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

In addition, the target yaw moment Ms is calculated based on lateral displacement X and the variation amount dx (step S7), and departure-avoiding deceleration is also calculated (step S8).

The target brake hydraulic pressure Psi (i=fl, fr, rl, rr) applied to each wheel for carrying out the braking control method is calculated based on the lane departure determination flag $F_{out}$, the first obstacle-containing direction $S_{out}$, and the lane departure direction $D_{out}$ and then the target brake hydraulic pressure Psi (i=fl, fr, rl, rr) is output to the brake hydraulic pressure control unit 7 as a brake hydraulic pressure command value (see, from step S9 to step S13).

More specifically, when the lane departure determination flag $F_{out}$ is OFF, the target brake hydraulic pressure Psi (i=fl, fr, rl, rr) applied to each wheel is set to the master cylinder hydraulic pressure Pmf and Pmr (step S 12). Furthermore, target brake hydraulic pressure Psi (i=fl, fr, rl, rr) applied to each wheel for carrying out the braking control method is calculated based on the first obstacle-containing direction $S_{out}$ and the lane departure direction $D_{out}$ when the lane departure determination flag $F_{out}$ is ON and the driving lane is a straight lane or when the lane departure determination flag $F_{out}$ is ON, and the driving lane is a curved lane and also when the lane departure direction is towards the outside direction of the curved lane (step S10, step S11 and step S13).

The target brake hydraulic pressure Psi (i=fl, fr, rl, rr) is output to the brake hydraulic pressure control unit 7 as a brake hydraulic pressure command value (steps S12 or S13). In the brake hydraulic pressure control unit 7, the brake hydraulic pressure is individually controlled for the wheel cylinders 6FL to 6RR based on the brake hydraulic pressure command value. Therefore, the configuration is such that when there is a lane departure tendency, a predetermined vehicle behavior is exhibited in accordance with the driving environment.

Figure 10:
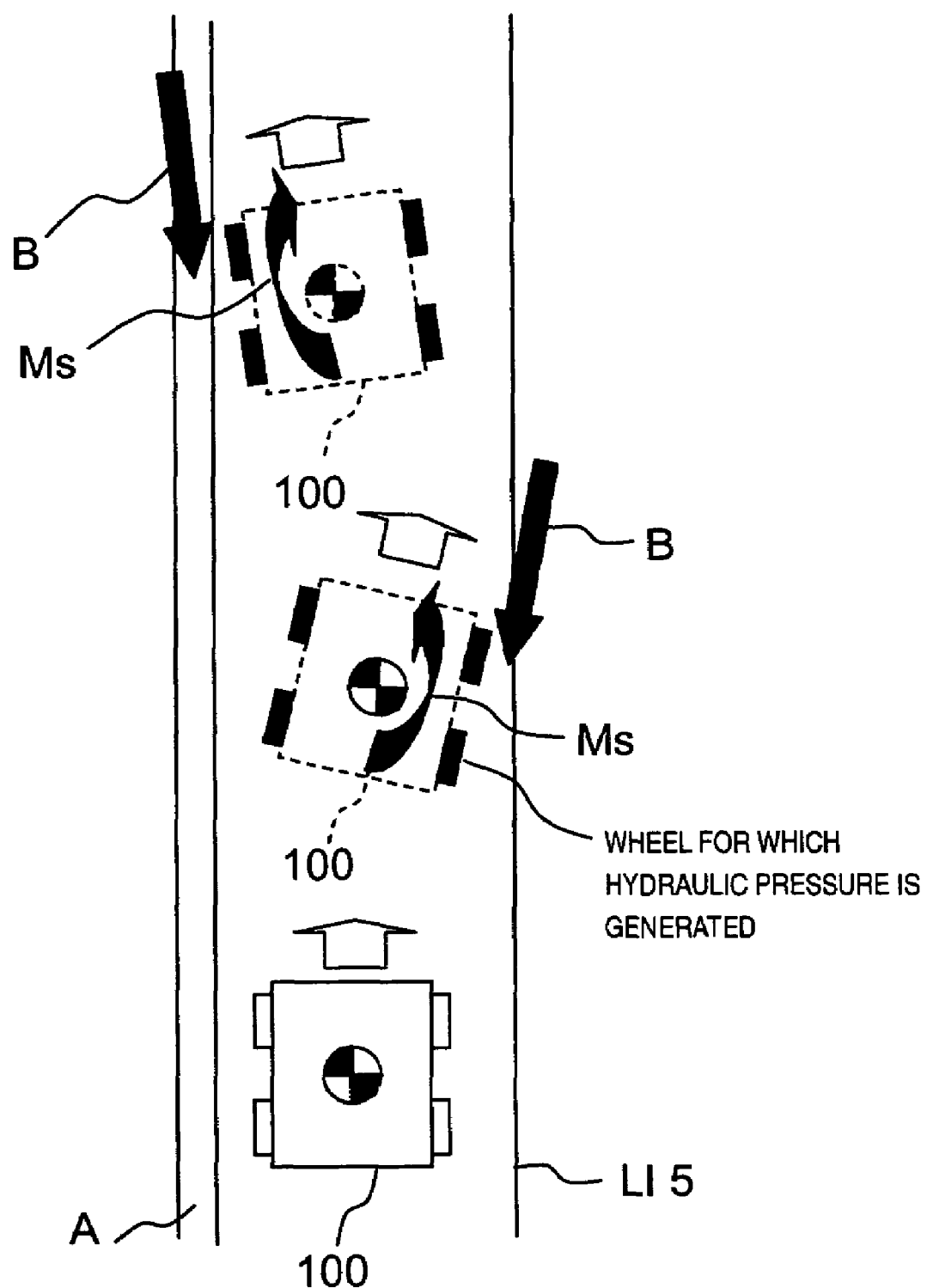
FIG. 10 is a diagram used for describing the braking control method in the second case or scenario.

Here, the manner in which the host vehicle behaves when braking control is carried out is described for the first to third scenarios or cases with reference to FIGS. 10 (second case) and 11 (first and third cases).

Figure 11:
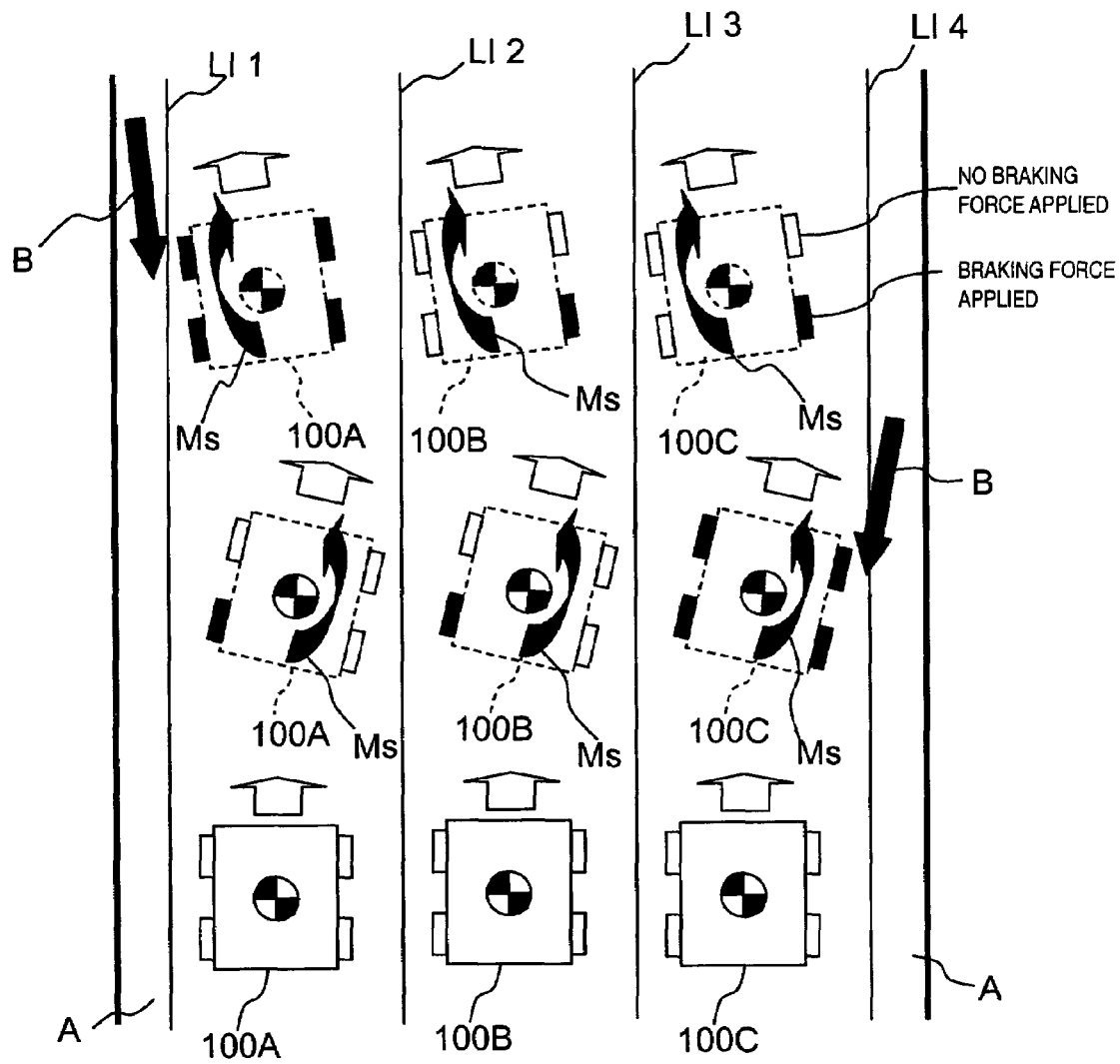
FIG. 11 is a diagram used for describing the braking control method in the third case or scenario.

The wheels colored in black in FIGS. 10 and 11 are those in which hydraulic pressure is generated and braking force is provided. In other words, when either one of the left and right wheels is a wheel colored in black, there is a difference in hydraulic pressure or braking force in the left and right wheels. This case shows a yaw moment imparted to the host vehicle. Also, when the left and right wheels are colored in black, there can still be a difference in the hydraulic pressure values thereof, in which case the host vehicle undergoes controlled deceleration while a yaw moment is simultaneously imparted to the host vehicle.

The second case, as described above, is one in which there is a match between the obstacle-containing direction $S_{out}$ and the lane departure direction $D_{out}$ and where the road type R is an ordinary road. In other words, when the host vehicle 100 is traveling on a two-lane, two-way road wherein the road shoulder A is to the left and the opposing lane (center lane LI 5 side) is to the right, there are cases in which the host vehicle 100 (the host vehicle 100 in the uppermost position of FIG. 10) may tend to depart in the left-hand direction, and cases in which the host vehicle (the host vehicle 100 in the center position of FIG. 10) may tend to depart in the right-hand direction, as shown in FIG. 10.

In this case, the lane departure-avoiding yaw control is carried out. Furthermore, when the estimated time of departure $T_{out}$ becomes less than the second departure-determining threshold Tr, the lane departure-avoiding -yaw control is applied, and the lane departure-avoiding deceleration control is carried out. The host vehicle thereby avoids departure. The driver can feel the lane departure avoidance action as acceleration in the lateral direction or as deceleration in the direction of travel, and know that the host vehicle has a tendency to depart.

The third case, as described above, is one in which there is a match between the first obstacle-containing direction $S_{out}$ and the lane departure direction $D_{out}$, and where the road type R is an expressway. In other words, this is a case in which the host vehicle 100A (host vehicle 100A in the uppermost position of FIG. 11) traveling in the left-hand lane on a three-lane, one-way road has a tendency to depart in the left-hand direction, as shown in FIG. 11. An alternative case is one in which the host vehicle 100C (host vehicle 100C in the center position of FIG. 11) traveling in the right-hand lane on a three-lane, one-way road has a tendency to depart in the right-hand direction, as shown in FIG. 11.

In this case, departure-avoiding yaw control is carried out. The host vehicle can thereby avoid departure. Furthermore, when the estimated time of departure $T_{out}$ reaches 0, in other words, when it is determined that the host vehicle has departed from the driving lane, the lane departure-avoiding yaw control is applied, and the lane departure-avoiding deceleration control is carried out.

The first case, as described above, is one in which there is no match between the obstacle-containing direction $S_{out}$ and the lane departure direction $D_{out}$. In other words, there are cases in which the host vehicle 100A (host vehicle 100A in the center position of FIG. 11) traveling in the left-hand lane on a three-lane, one-way road has a tendency to depart in the right-hand direction, as shown in FIG. 11. There are also cases in which the host vehicle 100C (host vehicle 100C in the lowermost position of FIG. 11) traveling in the right-hand lane on a three-lane, one-way road has a tendency to depart in the left-hand direction, as shown in FIG. 11. There are furthermore cases in which the host vehicle 100B traveling in the center lane has a tendency to depart in the left-hand or right-hand direction. The lane departure-avoiding yaw control is carried out in this case. The host vehicle can thereby avoid departure.

A warning is issued using sound or a display along with braking control for this type of departure avoidance. For example, the warning starts the same time braking control starts or at a specified timing before braking control.

Figure 12:
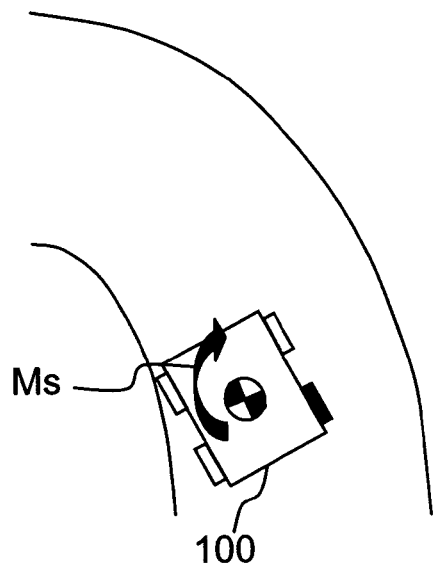
FIG. 12 is a pair of diagrams used for comparing the lane departure prevention apparatus in the first embodiment and a conventional departure prevention apparatus.
Figure 12:
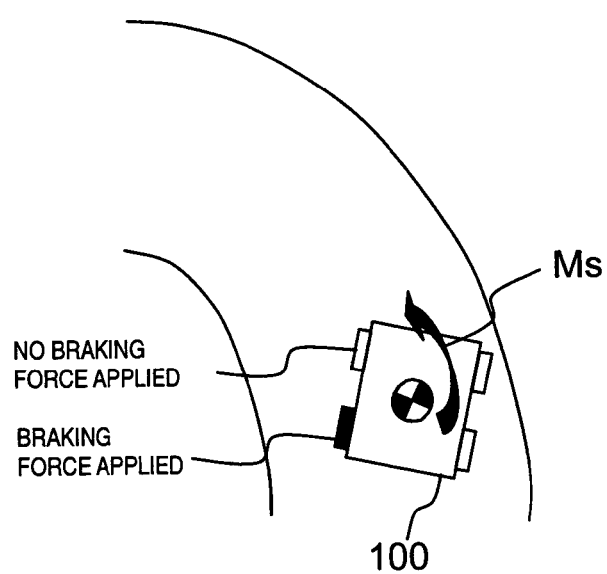

Even if the driving lane is a curved lane, the vehicle behavior will be as shown the diagram (B) of FIG. 12 due to the lane departure-avoidance yaw control when the lane departure direction is towards the outside direction of the curved lane. Because of this, departure of the host vehicle towards the outside direction of the curved lane can be avoided.

The description above using FIG. 10 to FIG. 12 describes the behavior of the vehicle when braking control is implemented for departure avoidance when the driving lane is a straight lane or a curved lane while the lane departure direction is towards the outside direction of the curved lane. In contrast to this, only the deceleration control for departure avoidance is implemented in response to the lane departure tendency when the driving lane is a curved lane and the lane departure direction is towards the inside direction of the curved lane. Further, at this time a warning sound outputs to notify the driver of the intent to prohibit the lane departure-avoidance yaw control (step S14).

For example, as described above, when the driving lane is a straight lane or a curved lane while the lane departure direction is towards the outside direction of the curved lane, the lane departure-avoidance yaw control will be implemented at a predetermined timing. For instance, only the deceleration control for departure avoidance is implemented in response to the lane departure tendency when the lane departure direction is towards the outside direction of the curved lane although deceleration control for departure avoidance is used instead of the lane departure-avoidance yaw control implemented at this type start timing for the lane departure-avoidance yaw control. Furthermore, only the deceleration control for departure avoidance is implemented in response to the lane departure tendency when the lane departure direction is towards the inside direction of the curved lane although the lane departure-avoidance yaw control is also implemented at the timing of the main unit without executing the deceleration control for departure avoidance instead of the lane departure-avoidance yaw control implemented at the start timing for the lane departure-avoidance yaw control. Even further, at this time a warning sound outputs to notify the driver of the intent to prohibit the lane departure-avoidance yaw control. Because of this, even if there is a lane departure tendency when the lane departure direction is towards the inside direction of the curved lane, there is no contribution of the lane departure-avoidance yaw control as shown in diagram (A) of FIG. 12.

Next, the effects of the invention will be described.

As described above, the lane departure-avoidance yaw control is not implemented when there is a tendency for the host vehicle to depart towards the inside direction of the curved lane.

When the host vehicle is driving on a curved lane, the driver has a tendency to drive along the inside direction of the curved lane. For this case as well, the driver will feel that something is wrong if there is a lane departure tendency and the lane departure-avoidance yaw control is implemented. Even further, when this type of departure-avoidance yaw control is implemented, there is a possibility that the host vehicle may travel towards the outside direction of the curved lane at that time. This is a departure of the host vehicle towards the outside direction of the curved lane.

Because of this, by means of not implementing the lane departure-avoidance yaw control when there is a tendency for the host vehicle to depart towards the inside direction of the curved lane, the driver feeling that something is wrong even though the lane departure-avoidance yaw control is implemented is prevented and the host vehicle prevented from departing towards the outside direction of the curved lane.

In contrast this, when there is a tendency for the host vehicle to depart towards the outside direction of the curved lane, the host vehicle departing towards the outside direction of the curved lane is prevented by means of not prohibiting the lane departure-avoidance yaw control and implementing the lane departure-avoidance yaw control as necessary in the normal manner.

In addition, as described above, when the lane departure-avoidance yaw control is not implemented while there is a tendency for the host vehicle to depart towards the inside direction of the curved lane, a warning sound outputs to notify the driver of the intent to prohibit the lane departure-avoidance yaw control. This makes it possible for the driver to know that the lane departure-avoidance yaw control to avoid departure is not being implemented thereby making it possible for the driver to take suitable measures such as driving actions.

Second Embodiment

Figure 13:
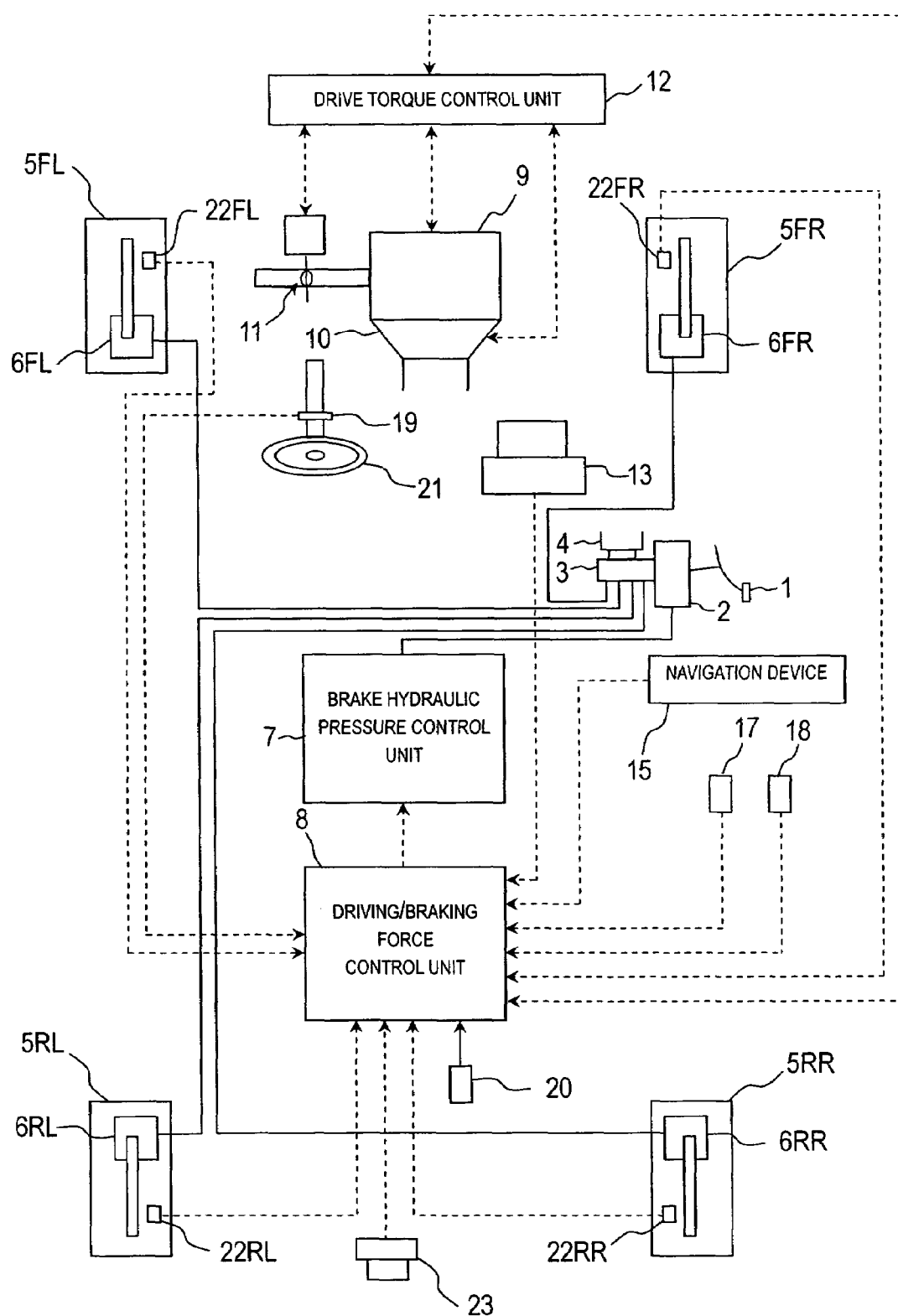
FIG. 13 is a schematic structural diagram of a vehicle equipped with a lane departure prevention apparatus in accordance with a second embodiment of the present invention.
Figure 14:
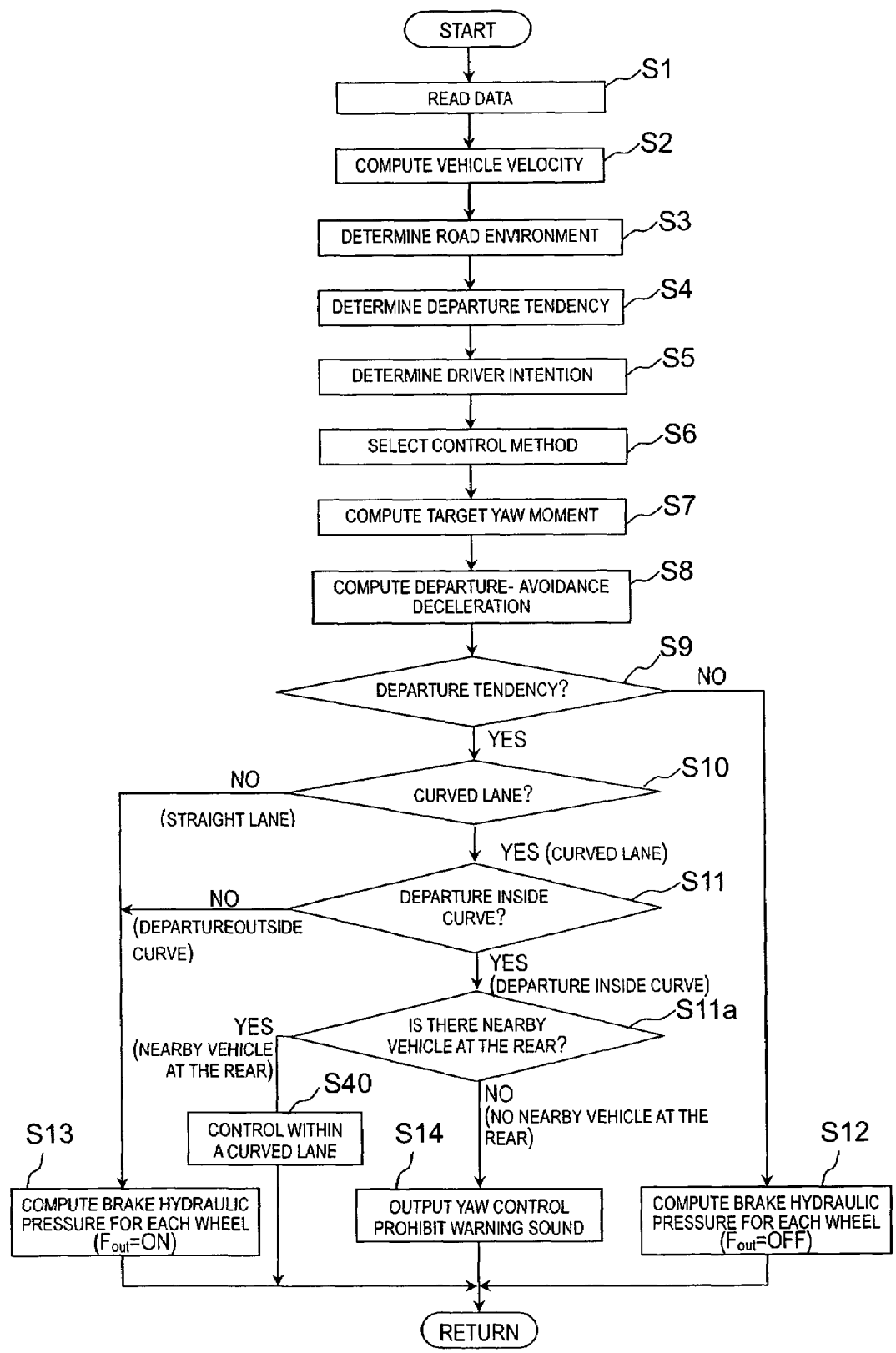
FIG. 14 is a flowchart illustrating the processing content for the driving/braking force control unit when a trailing vehicle is present in accordance with a second embodiment of the present invention.
Figure 18:
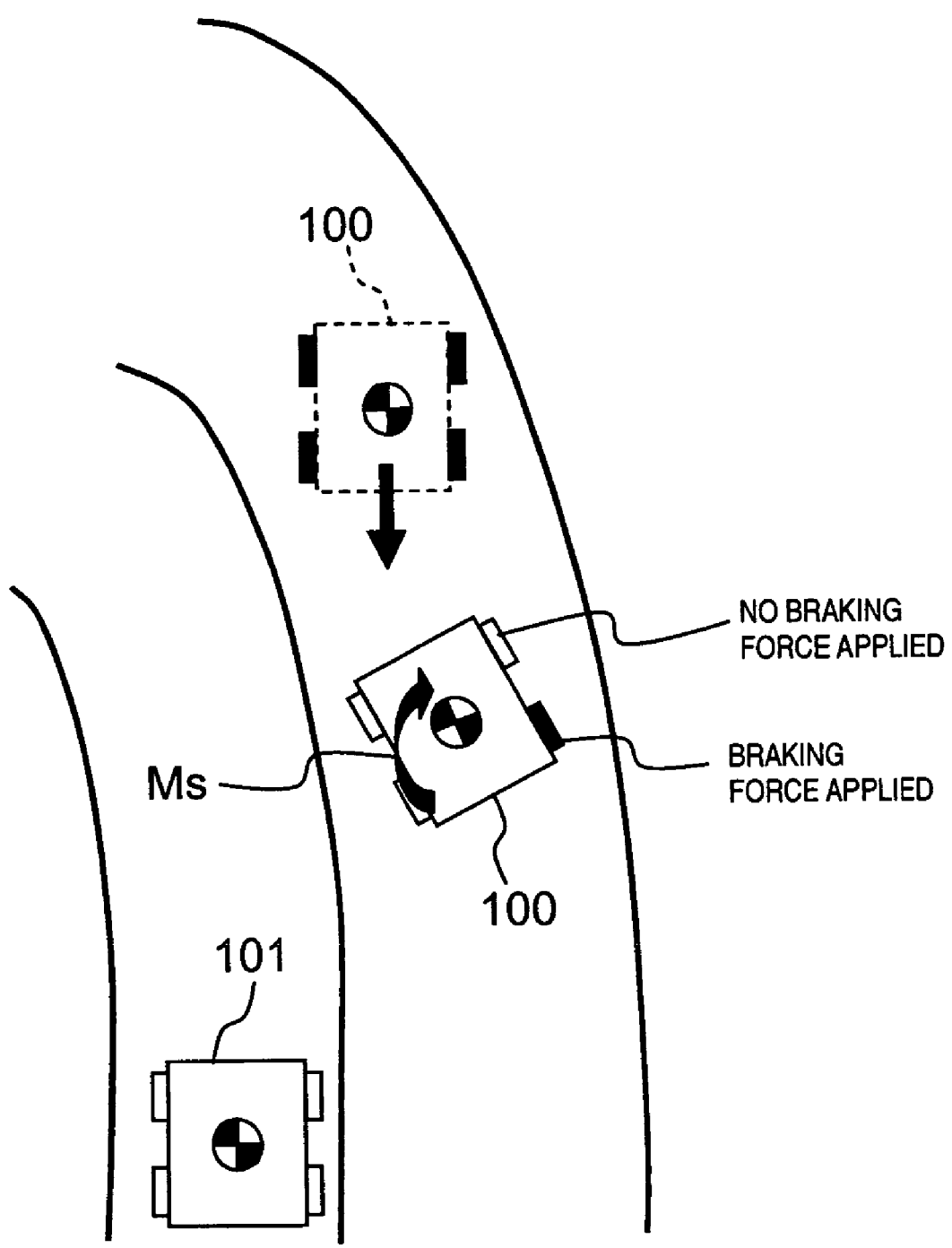
FIG. 18 is a diagram used for describing the lane departure prevention apparatus in the second embodiment.

Referring now to FIGS. 13 and 18, a vehicle equipped with a lane departure prevention apparatus in accordance with a second embodiment will now be explained. The configuration of the vehicle (FIG. 13) in this second embodiment is the same as the configuration of the vehicle in the first embodiment (see FIG. 1), except the addition of a rear monitoring camera 23 that is provided to monitor the vehicles behind the vehicle equipped with the lane departure prevention apparatus in accordance with the present invention. In view of the similarity between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity. In other words, unless otherwise specified, the rest of the configuration of the vehicle in the second embodiment is the same as the configuration of the first embodiment.

The rear monitoring camera 23 is a monocular camera composed of a CCD (Charge Coupled Device) camera and is installed at the rear portion of the vehicle.

Now, the calculation processing procedure executed by the driving/braking force control unit 8 will be described based on this second embodiment. This calculation processing procedure is almost the same as the calculation processing procedure of the first embodiment (FIG. 2) and only the different portions will be described.

Namely, in step S1 to step S8 reading each type of data, calculating vehicle speed, determining driving environment, determining lane departure tendency, determining driver intent, determining control methods, calculating target yaw moments, and calculating deceleration for departure avoidance.

Whether or not there is a lane departure tendency is determined using the lane departure determination flag $F_{out}$ in step S9. When the lane departure determination flag $F_{out}$ is ON, there is a lane departure tendency and the processing advances to step S10. When the lane departure determination flag $F_{out}$ is OFF, there is no departure tendency and the processing advances to step S12. Whether the lane the host vehicle is traveling on is a straight lane or a curved lane is determined in step S10. In other words, when the driving lane curve rate P is larger than the curved lane determination threshold value βcur (β>βcur), the processing advances to step S11 and when the driving lane curve rate β is equal to or less than the curved lane determination threshold value βcur (β=<βcur), the processing advances to step S13. Whether or not the lane departure direction is towards the inside direction of the curved lane is determined in step S11. Namely, when the lane departure direction $D_{out}$ is the same direction the curved lane curves, the processing advances to newly created step S11a and when the lane departure direction $D_{out}$ is opposite to the direction the curved lane curves, the processing advances to step S13.

Whether or not there is an nearby vehicle at the rear is determined in step S11a. More specifically, whether or not there is a vehicle (nearby vehicle at the rear) at the rear of the host vehicle in the lane departure direction is determined based on the output results of the rear monitoring camera 23 in this step. The rear of the host vehicle in the lane departure direction is defined as the driving lane (nearby lane) in the lane departure direction $D_{out}$ obtained in step S5 and is a rearward direction (in reality a diagonal rearward direction) seen from the host vehicle on the side of that driving lane. The nearby vehicle at the rear is a vehicle driving at the rear of the host vehicle in a departing direction in the same direction or almost the same direction as the host vehicle. When there is a nearby vehicle at the rear, the processing advances to step S40 and when there is no nearby vehicle at the rear, the processing advances to step S14.

Figure 15:
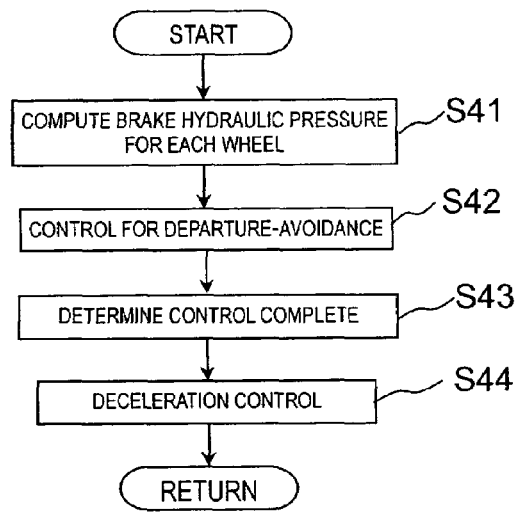
FIG. 15 is a flowchart showing the processing content for control within a curved lane of the driving/braking force control unit of the second embodiment.

Control within a curved lane executes in step S40. FIG. 15 shows the processing content for control within a curved lane.

At first, processing identical to step S13 is executed in step S41. In other words, the braking control method is determined based on the obstacle-containing direction $S_{out}$ and the lane departure direction $D_{out}$ and the target brake hydraulic pressure Psi (i=fl, fr, rl, rr) for each wheel is calculated in correspondence with the determined braking control method. Then, the driving/braking force control unit 8 outputs the calculated target brake hydraulic pressure Psi (i=fl, fr, rl, rr) for each wheel to the brake hydraulic pressure control unit 7 as a brake hydraulic pressure command value (step S41). This implements the lane departure-avoidance yaw control (step S42).

Continuing, whether or not the processing of step S41 has completed or the lane departure-avoidance yaw control (step S42) has completed is determined in step S63. When the processing of step S41 has completed or the lane departure-avoidance yaw control (step S42) has completed, deceleration control is implemented.

The deceleration control implemented here sets the target brake hydraulic pressures Pgf and Pgr applied to the left and right wheels as follows. The target brake hydraulic pressure Pgf for the front wheels is calculated using the equation (13) shown below.

$$Pgf = Kgvc*V + Kgc\beta*\beta \quad (13)$$

Figure 16:
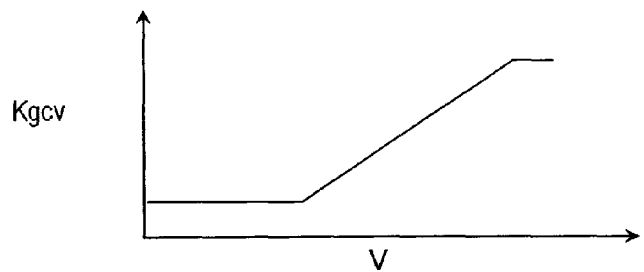
FIG. 16 is a characteristics diagram showing the characteristics of conversion factor Kgvc used for calculating the target brake hydraulic pressure Pgf of the second embodiment.
Figure 17:
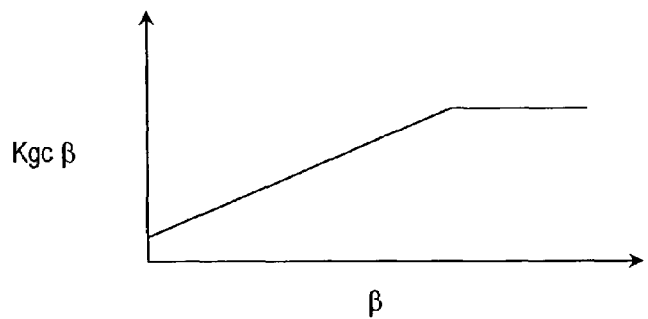
FIG. 17 is a characteristics diagram showing the characteristics of conversion factor Kgvβ used for calculating the target brake hydraulic pressure Pgf of the second embodiment.

In the equation, Kgvc and Kgcβ are conversion factors for converting the braking force into brake hydraulic pressure, and are respectively set based on the vehicle velocity V and the driving lane curve rate β. FIG. 16 and FIG. 17 show examples of this. As shown in FIG. 16, the conversion factor Kgvc has a small value at low speeds and when it becomes the vehicle speed V value, it increases along with the vehicle speed V and remains constant thereafter when a certain vehicle velocity V is reached. Furthermore, as shown in FIG. 17, the conversion factor Kgcβ increases along with the driving lane curve rate β within a small range of the driving lane curve rate β and remains constant thereafter when a certain driving lane curve rate β is reached.

The control within a curved lane is implemented in step S40 as described above.

According to the processing described above, even if the driving lane is a straight lane or a curved lane when the lane departure direction is towards the outside direction of the curved lane, the lane departure-avoidance yaw control is implemented in like manner to the first embodiment (steps S10, S11, S11*a* and S14).

When the driving lane is a curved lane, the lane departure direction is towards the inside direction of the curved lane and when there is a vehicle at the rear of the host vehicle in the lane departure direction, the control within a curved lane is implemented (steps S10, S11, S11*a* and S40).

During the control within a curved lane, the lane departure-avoidance yaw control is implemented (step S42) and after that departure-avoidance yaw control completes, the deceleration control is implemented (steps S43 and S44). FIG. 18 shows the vehicle behavior when this control within a curved lane is implemented. As shown in FIG. 18, when there is a nearby vehicle at the rear 101 in a direction departing the curved lane, the host vehicle 100 the implementation of the lane departure-avoidance yaw control decelerates the host vehicle inside the curved lane along with changing the direction of the host vehicle to the outside direction of the curved lane.

Next, the effects of the second embodiment will be described.

As described above, when there is a lane departure tendency towards the inside direction of a curved lane while there is a nearby vehicle at the rear 101 in a direction departing the curved lane, the lane departure-avoidance yaw control is implemented decelerating the host vehicle after the lane departure-avoidance yaw control avoids the lane departure.

Consequently, when there is a lane departure tendency towards the inside direction of a curved lane while there is a nearby vehicle at the rear 101 in a direction departing the curved lane, implementing the lane departure-avoidance yaw control makes it possible to prevent the host vehicle from straying into the adjacent lane and annoying the driver of the nearby vehicle at the rear 101 as well as prevent the host vehicle from straying into the adjacent lane and make contact with the nearby vehicle at the rear 101.

If the lane departure-avoidance yaw control is implemented when there is a lane departure tendency towards the inside direction of a curved lane, there is a possibility that the host vehicle may travel towards the outside direction of the curved lane. Because of this, implementing the deceleration control after the lane departure-avoidance yaw control avoids the lane departure towards the outside direction of the curved lane will prevent the host vehicle from departing towards the outside direction of the curved lane. As an example, implementing the deceleration control in this manner makes it possible for driver to use the processing time until the vehicle departs towards the outside direction. Furthermore, the deceleration control can be released when there is no deceleration action by the driver during the deceleration control.

Embodiments of the present invention have been described above, but the present invention is not limited to being realized as the above embodiments. That is, methods of combining braking control (departure-avoidance yaw control) so that yaw moment for avoiding departure is imparted to the vehicle, and deceleration control (departure-avoidance deceleration control) for decelerating to avoiding departure, the operating procedures of these methods, and the control amounts thereof (magnitude of the yaw moment and magnitude of the deceleration) were described in detail in the above embodiments, but it should go without saying that the present invention is not limited by these descriptions.

In addition, an embodiment in which a yaw moment was not contributed to the host vehicle when there is a lane departure tendency towards the inside direction of a curved lane was described in the previous embodiment. However, the present invention is not limited to this. In other words, when there is a tendency to depart towards the inside direction of a curved lane, a yaw moment can be contributed to the host vehicle or the contribution of a yaw moment to the host vehicle can be controlled.

Further, the brake structure described in the embodiments above is one in which hydraulic pressure is used. However, the present invention is not limited to this. It is also possible, for example, to use electric powered friction brakes that press a friction material to the rotor of a wheel side member by means of an electric actuator, or regenerative brakes or dynamic brakes that electrically cause braking action. Other options include engine brakes that provide braking control by changing the valve timing or the like of the engine, gear brakes that operate as engine brakes by changing the gear ratio, or air brakes.

Also, in the above embodiments the estimated time of departure $T_{out}$ was calculated on the basis of the lateral displacement X and the amount of change dx therein (see Equation (2) above), but the estimated time of departure $T_{out}$ can be obtained by some other method. For instance, the estimated time of departure $T_{out}$ can be obtained on the basis of the yaw angle φ, the driving lane curvature β, the yaw rate φ', or the steering angle δ.

Also, in the above embodiments the intention of the driver to make a lane change was ascertained on the basis of the steering angle δ and the amount of change Δδ therein (see step S5), but the intention of the driver to make a lane change can be ascertained by some other method. For instance, the intention of the driver to make a lane change can be ascertained on the basis of the steering torque.

Also, the target yaw moment Ms was calculated in the above embodiments on the basis of the lateral displacement X and the amount of change dx (see Equation (3) above), but the target yaw moment Ms can also be obtained by another method. For instance, the target yaw moment Ms can be obtained on the basis of the yaw angle φ, the lateral displacement X, or the driving lane curvature β, as shown in Equation (14) below.

$$Ms = K3\cdot\phi + K4\cdot X + K5\cdot\beta \quad (14)$$

Here, the terms K3, K4, and K5 are gains that fluctuate with the vehicle speed V.

Also, the target brake hydraulic pressure Pgf for the front wheels was described in the above embodiments by using a specific equation (see Equation 4), but the present invention is not limited to this. For instance, the target brake hydraulic pressure Pgf for the front wheels can also be calculated from Equation (15) below.

$$Pgf = Kgv \cdot V + Kg\phi \cdot \phi + Kg\beta \cdot \beta \qquad (15)$$

Here, the terms $Kg\phi$ and $Kg\beta$ are conversion factors that are used for converting braking force into brake hydraulic pressure, and are set on the basis of the yaw angle $\phi$ and the driving lane curvature $\beta$, respectively.

The target hydraulic pressure differentials $\Delta Psf$ and $\Delta Psr$ for the front and rear wheels are calculated in order to realize departure-avoidance yaw control in the embodiments described above (refer to equations (7) and (8)). However, the present invention is not limited to this. For example, the lane departure-avoidance yaw control can be realized solely with front wheel target hydraulic pressure difference $\Delta Psf$. For this case, the front wheel target hydraulic pressure difference $\Delta Psf$ is calculated using equation (16) below.

$$\Delta Psf = 2 \cdot Kbf \cdot Ms/T \qquad (16)$$

The processing of step S9 to step S11 in the driving/braking force control unit 8 in the embodiments described above is realized by a process or method that does not contribute a yaw moment to the host vehicle when there is a tendency to depart towards the inside direction of a curved lane.

Third Embodiment

Referring now to FIGS. 19 to 23, a vehicle equipped with a lane departure prevention apparatus in accordance with a third embodiment will now be explained. The configuration of the vehicle in this third embodiment is the same as the configuration of the vehicle in the first embodiment (see FIG. 1). In view of the similarity between the first and third embodiments, the parts or steps of the third embodiment that are identical to the parts or steps of the first embodiment will be given the same reference numerals as the parts and steps of the first embodiment. Moreover, the descriptions of the parts or steps of the third embodiment that are identical to the parts or steps of the first embodiment may be omitted for the sake of brevity. In other words, unless otherwise specified, the rest of the configuration of the vehicle in the third embodiment is the same as the configuration of the first embodiment.

Figure 19:
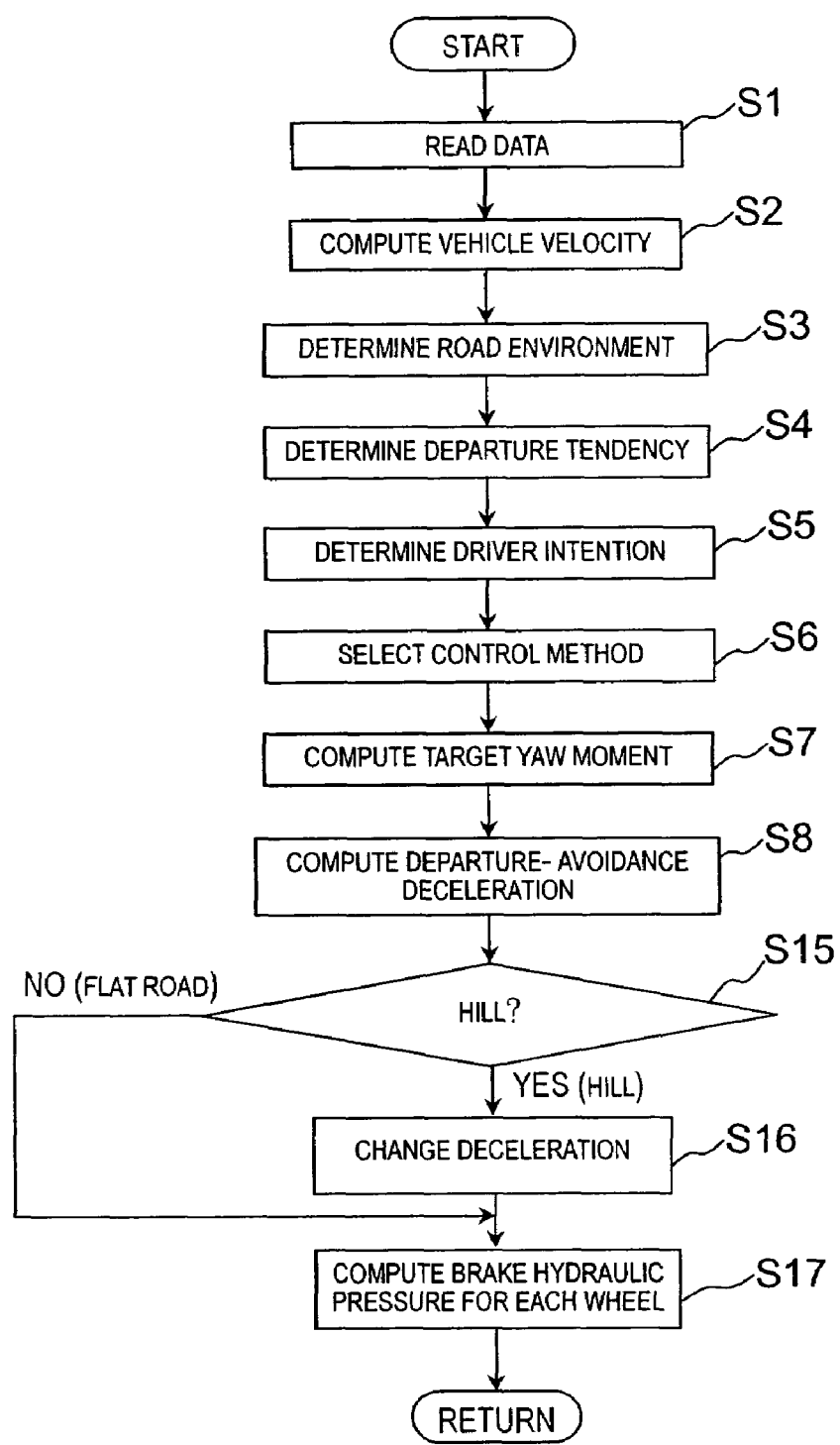
FIG. 19 is a flowchart illustrating the processing content for the driving/braking force control unit when a trailing vehicle is present in accordance with a third embodiment of the present invention.

FIG. 19 shows the computational processing procedure performed by the driving/braking force control unit 8 of this third embodiment. The computational processing procedure is substantially the same as the computational processing procedure in the first embodiment, and only those parts that are particularly different will be described.

Specifically, in steps S1 to S8, various kinds of data are read, the vehicle speed is calculated, the driving environment is evaluated, the lane departure tendency is evaluated, the driver's intention is determined, the control method is selected, the target yaw moment is calculated, and the lane departure-avoidance deceleration is calculated in the same manner as in the first embodiment.

In step S8 of this embodiment, the deceleration for departure-avoidance is calculated in a slightly different manner from the first embodiment. At first, the target brake hydraulic pressure Pg is calculated using the Equation (4) as presented above. Then, the target brake hydraulic pressure Pgf for the front wheel is calculated from this target brake hydraulic pressure Pg by the deceleration gain Kgg as shown in Equation (17) below $$Pgf = Pg * Kgg \qquad (17)$$

The deceleration gain Kgg is normally 1 although is changes when the host vehicle is driving on a hill as described later.

The target brake hydraulic pressure Pgr is calculated for the rear wheels based on the target brake hydraulic pressure Pgf for the front wheels while taking the front and rear braking distribution into consideration. Thus, the deceleration for lane departure-avoidance (more specifically, the target brake hydraulic pressure Pgf and Pgr) is obtained in this manner in step S8.

Next, in step S15, whether or not the host vehicle is traveling on a hill is determined. In this step, the host vehicle will be determined to be traveling on a hill if the host vehicle is traveling either uphill or downhill. This determination is performed by determining whether or not the host vehicle is traveling on a flat road based on vehicle information (for example, acceleration) from road information from the navigation device 15 or from various sensors. When the result of this determination is that the host vehicle is traveling on a hill, the processing advances to step S 16. When the result is that the host vehicle is not traveling on a hill (when the host vehicle is traveling on a flat road), the processing advances to step S17.

Figure 20:
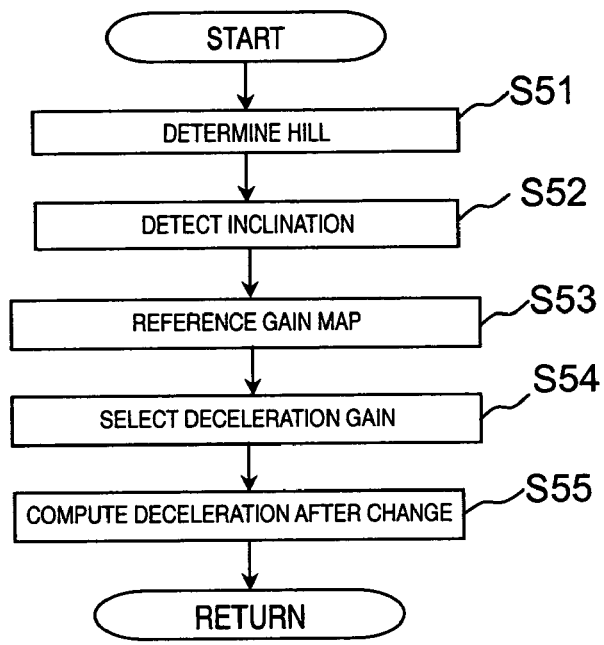
FIG. 20 is a flowchart showing the processing content for changing the deceleration of the driving/braking force control unit.

Processing for changing the deceleration is performed in step S16. FIG. 20 is a flowchart showing the processing procedure for changing the deceleration.

At first, the hill is determined in step S51. More specifically, downhill or uphill is determined.

Continuing to step S52, a road inclination value of the downhill or uphill road, is detected based on the determination result of step S51. For example, a road inclination value is obtained based on information from the navigation device 15.

Next, in step S53, the deceleration gain Kgg is obtained based on the road inclination value obtained in step S52. More specifically, the gain map is initially referenced in step S53.

Figure 21:
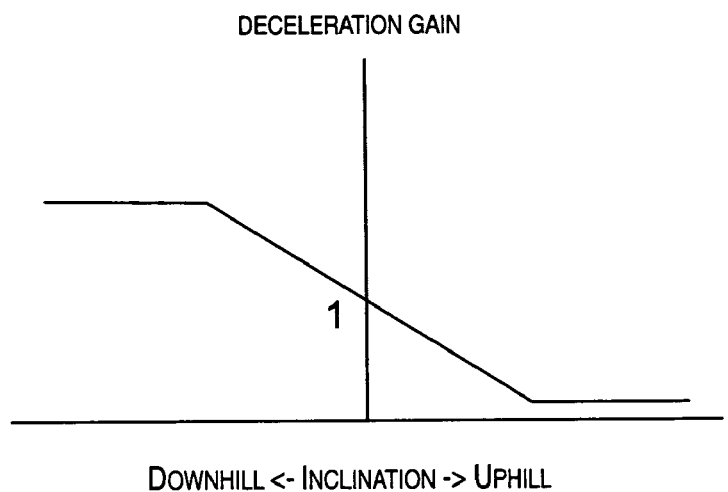
FIG. 21 is a gain map used for the processing to change the deceleration.
Figure 22:
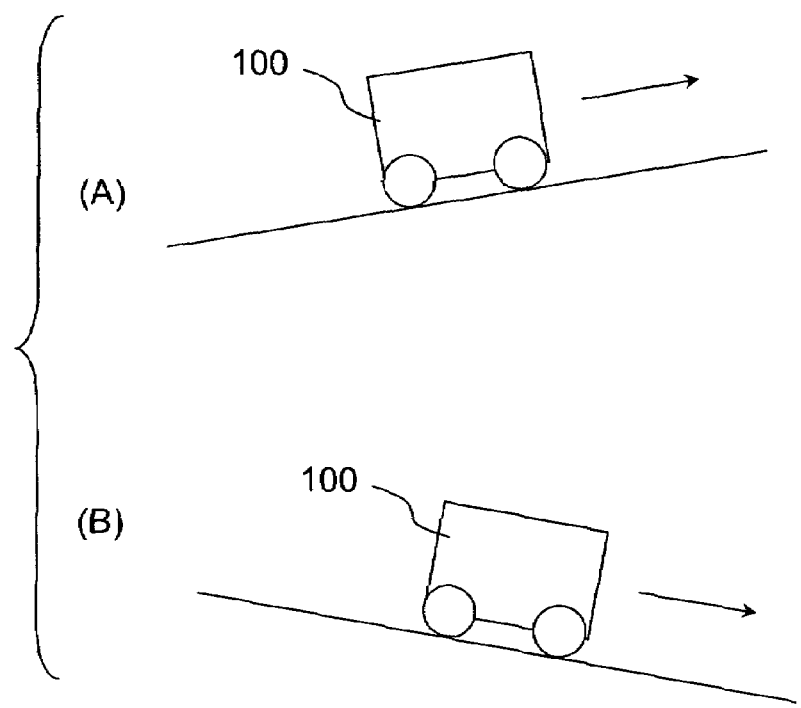
FIG. 22 is a pair of diagrams used to describe the lane departure-avoidance control method setting the deceleration to either (A) a value smaller than the flatness when the host vehicle is driving uphill or (B) a value larger that the flatness when the host vehicle is driving downhill.

FIG. 21 shows an example of a gain map. As shown in this gain map, the road inclination value is a positive value when the road is uphill and a negative value when the road is downhill. For this gain map, the deceleration gain Kgg will be 1 when the road inclination value is 0 and if the road inclination value increases from 0 (becomes an uphill inclination), the deceleration gain Kgg will decrease from 1 in response to that increase. Further, if a certain road inclination value is reached, the deceleration gain Kgg will be a steady value after reaching that road inclination value (uphill inclination is more up). In contrast, if the road inclination value decreases from 0 (becomes a downhill inclination), the deceleration gain Kgg will increase from 1 in response to that decrease. Further, if a certain road inclination value is reached, the deceleration gain Kgg will be a steady value after reaching that road inclination value (downhill inclination is more down).

In step S53, the gain map is referenced in this manner and the deceleration gain Kgg that corresponds to the road inclination value obtained based on the reference results in subsequent step S54.

Next, the deceleration after the change is calculated in step S55. More specifically, the target brake hydraulic pressure Pgf for the front wheel is calculated using the deceleration gain Kgg obtained in step S54 using equation (17). Then, the target brake hydraulic pressure Pgr for the rear wheel is calculated taking into consideration the front and rear distribution based on this target brake hydraulic pressure Pgf for the front wheel. Because of this, the target brake hydraulic pressures Pgf and Pgr for the front and rear wheels are changed and as a result the deceleration is changed in response to the road inclination value.

More specifically, if the road is uphill, the deceleration value will become smaller as that road inclination value becomes larger and if the road is downhill, the deceleration value will become larger as that road inclination value becomes larger (as the road inclination value becomes a larger negative number).

The deceleration is changed in step S16 in this manner and the processing advances to step S17.

The processing of step S17 is also processing advanced to when the host vehicle is traveling on a flat road in step S15. The target brake hydraulic pressure of both wheels is calculated in step S17. In other words, the final brake hydraulic pressure is calculated based on the presence or absence of braking control for departure avoidance. More specifically, the calculation is as follows.

(1) When the lane departure determination flag $F_{out}$ is OFF ($F_{out}$=OFF), namely, when the determination result is that there is no departure, the target brake hydraulic pressure applied to each wheel Psi (i=fl, fr, rl, rr) is set to the master cylinder hydraulic pressure Pmf and Pmr as shown in Equations (5) and (6) above.

(2) When the lane departure determination flag $F_{out}$ is ON ($F_{out}$=ON), i.e., when it is determined that lane departure will occur, the front wheel target brake hydraulic pressure difference ΔPsf and the rear wheel target brake hydraulic pressure difference ΔPsr are first calculated based on the target yaw moment Ms. More specifically, the target brake hydraulic pressure differences ΔPsf and ΔPsr are calculated with Equations (7) to (10) above.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference ΔPsf is set to 0, a predetermined value is assigned to the rear wheel target brake hydraulic pressure difference ΔPsr, and the braking force difference is generated in the left and right rear wheels. When the target yaw moment Ms is equal to or greater than the threshold Ms1 used for setting purposes, a predetermined value is assigned to the target brake hydraulic force differences ΔPsf and ΔPsr, and the braking force difference is generated in the front and rear left and right wheels.

When the lane departure determination flag $F_{out}$ is ON ($F_{out}$=ON), the final target brake hydraulic pressure Psi (i=,fl, fr, rl, rr) for each wheel is calculated using the target brake hydraulic pressure differences ΔPsf and ΔPsr and the target brake hydraulic pressures Pgf and Pgr calculated as described above. More specifically, the final target brake hydraulic pressure Psi (i=fl, fr, rl, rr) for each wheel is calculated based on the braking control method selected in step S6.

In step S6, when the lane departure determination flag $F_{out}$ is ON, the braking control method is selected based on the obstacle-containing direction $S_{out}$ and the lane departure direction $D_{out}$. First, the braking control method selected based on the obstacle-containing direction $S_{out}$ and the lane departure direction $D_{out}$ when the lane departure determination flag $F_{out}$ is ON will be described below for various relationships between the obstacle-containing direction $S_{out}$ and the lane departure direction $D_{out}$ (first to third cases or scenarios as discussed above in the first embodiment).

Thus, the braking control methods are selected in step S6 in accordance with the obstacle-containing direction $S_{out}$ and the lane departure direction $D_{out}$ in the same manner as the first embodiment. In other words, the braking control method for departure avoidance is selected by departure-avoiding yaw control alone or by a combination of the lane departure-avoiding yaw control and the lane departure-avoiding deceleration control in accordance with the obstacle-containing direction $S_{out}$ and the lane departure direction $D_{out}$, and/or in accordance with the host vehicle velocity V and the estimated time of departure $T_{out}$.

The target brake hydraulic pressure Psi (i=fl, fr, rl, rr) for each wheel is calculated in step S17 in accordance with each type of braking control method.

In the lane departure-avoiding yaw control for the first to third cases, for example, the target brake hydraulic pressure Psi (i=fl, fr, rl, rr) for each wheel is calculated with Equation (11) above.

The lane departure-avoiding yaw control and the lane departure-avoiding deceleration control are carried out in the second and third cases, but in this case the target brake hydraulic pressure Psi (i=fl, fr, rl, rr) for each wheel is calculated with Equation (12) above.

Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

When the host vehicle is traveling uphill, the target brake hydraulic pressures Pgf and Pgr become values smaller than the target brake hydraulic pressures Pgf and Pgr when the host vehicle is traveling on a flat road. When the host vehicle is traveling downhill, the target brake hydraulic pressures Pgf and Pgr become values larger than the target brake hydraulic pressures Pgf and Pgr when the host vehicle is traveling on a flat road.

The above describes the processing for step S11. Thus, the target brake hydraulic pressure Psi (i=fl, fr, rl, rr) for each wheel is calculated based on the state of the lane departure determination flag $F_{out}$ in this step S11. When the lane departure determination flag $F_{out}$ is ON, the target brake hydraulic pressure Psi (i=fl, fr, rl, rr) for each wheel is calculated in accordance with the braking control method selected in step S6 in response to the relationship between the first obstacle-containing direction $S_{out}$ and the value of the lane departure direction $D_{out}$.

In the description above, the calculations are processed by the driving/braking force control unit 8. The driving/braking force control unit 8 outputs the target brake hydraulic pressure Psi (i=fl, fr, rl, rr) for each wheel calculated in step S11 to the brake hydraulic pressure control unit 7 as a brake hydraulic pressure command value.

The lane departure prevention apparatus described above operates according to the following overview.

First, various kinds of data are read from the sensors, the controllers, and the control units (step S1). Next, the vehicle speed V is then calculated (step S2).

The driving environment is then evaluated and the direction in which the safety level is relatively lowest (first obstacle-containing direction $S_{out}$) is determined (step S3, FIG. 3). For example, if the host vehicle 100A is traveling in the left lane in FIG. 4, the obstacle-containing direction $S_{out}$ is used as the left-hand direction.

In step S4, the lane departure determination flag $F_{out}$ is set based on the estimated time of departure $T_{out}$, and the lane departure direction $D_{out}$ is determined based on the lateral displacement X (see FIG. 7).

Furthermore, the driver's intention to change lanes is determined based on the lane departure direction $D_{out}$ obtained in this manner and/or on the direction (lighted blinker side) indicated by the turn signal switch 20 (step S5).

For example, when the direction (lighted blinker side) indicated by the turn switch signal and the direction indicated by the lane departure direction $D_{out}$ are the same, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

Furthermore, that method is determined for the presence or absence of a warning start for departure avoidance, the presence or absence of braking control for departure avoidance and when implementing braking control for departure avoidance based on the determination flag $F_{out}$, the obstacle-containing direction $S_{out}$ and the lane departure direction $D_{out}$ (step S6).

Even further, the target yaw moment Ms is calculated based on lateral displacement X and the variation amount dx (step S7), and deceleration for departure avoidance is also calculated (step S8).

The target brake hydraulic pressure Psi (i=fl, fr, rl, rr) applied to each wheel for carrying out the braking control method determined based on the lane departure determination flag $F_{out}$, the obstacle-containing direction $S_{out}$, and the lane departure direction $D_{out}$ is calculated (step S117).

When the host vehicle is traveling on a flat road, the target brake hydraulic pressure Psi (i=fl, fr, rl, rr) applied to each wheel is calculated to be the deceleration calculated in step S8. When the host vehicle is traveling uphill, the deceleration calculated in step S8 is changed to a small value. For this case, the deceleration will become smaller as the road inclination value becomes larger. In addition, the target brake hydraulic pressure Psi (i=fl, fr, rl, rr) applied to each wheel is calculated to be the deceleration after that change. When the host vehicle is traveling downhill, the deceleration calculated in step S8 is changed to a large value. For this case, the deceleration will become larger as the road inclination value becomes larger (as the road inclination value becomes a larger negative number). Even further, the target brake hydraulic pressure Psi (i=fl, fr, rl, rr) applied to each wheel is calculated to be the deceleration after that change.

The target brake hydraulic pressure Psi (i=fl, fr, rl, rr) is output to the brake hydraulic pressure control unit 7 as a brake hydraulic pressure command value (step S1 7). In the brake hydraulic pressure control unit 7, the brake hydraulic pressure is individually controlled for the wheel cylinders 6FL to 6RR based on the brake hydraulic pressure command value. Therefore, the configuration is such that when there is a lane departure tendency, a predetermined vehicle behavior is exhibited in accordance with the driving environment.

Next, FIG. 1 and FIG. 19 will be used to describe the vehicle behavior during braking control from the first case to the third case. Here, it is assumed that the host vehicle is traveling on a flat road. Namely, that the deceleration gain Kgg is 1.

As described above, the second case is when the obstacle-containing direction $S_{out}$ and the lane departure direction $D_{out}$ match and the road classification R is an ordinary road. In other words, as shown in FIG. 10, when the host vehicle 100 (host vehicle 100 located at the top of FIG. 10) has a tendency to depart towards the left or the host vehicle 100 (host vehicle 100 located at the center of FIG. 10) has a tendency to depart towards the right while the left side is road shoulder A and the host vehicle 100 is traveling on a one-lane, one-way road such that the right side is the opposing vehicle lane (center lane L I5 side).

In this case, the lane departure-avoiding yaw control is carried out. Furthermore, when the estimated time of departure $T_{out}$ becomes less than the second departure-determining threshold Tr, the lane departure-avoiding yaw control is applied, and the lane departure-avoiding deceleration control is carried out. The host vehicle thereby avoids departure. The driver can feel the lane departure avoidance action as acceleration in the lateral direction or as deceleration in the direction of travel, and know that the host vehicle has a tendency to depart.

The third case, as described above, is one in which there is a match between the first obstacle-containing direction $S_{out}$ and the lane departure direction $D_{out}$, and where the road type R is an expressway. In other words, this is a case in which the host vehicle 100A (host vehicle 100A in the uppermost position of FIG. 11) traveling in the left-hand lane on a three-lane, one-way road has a tendency to depart in the left-hand direction, as shown in FIG. 11. An alternative case is one in which the host vehicle 100C (host vehicle 100C in the center position of FIG. 11) traveling in the right-hand lane on a three-lane, one-way road has a tendency to depart in the right-hand direction, as shown in FIG. 11.

In this case, departure-avoiding yaw control is carried out. The host vehicle can thereby avoid departure. Furthermore, when the estimated time of departure $T_{out}$ reaches 0, in other words, when it is determined that the host vehicle has departed from the driving lane, the lane departure-avoiding yaw control is applied, and the lane departure-avoiding deceleration control is carried out.

The wheels colored in black in FIGS. 10 and 11 are those in which hydraulic pressure is generated and braking force is provided. In other words, when either one of the left and right wheels is a wheel colored in black, there is a difference in hydraulic pressure or braking force in the left and right wheels. This case shows a yaw moment imparted to the host vehicle. Also, when the left and right wheels are colored in black, there can still be a difference in the hydraulic pressure values thereof, in which case the host vehicle undergoes controlled deceleration while a yaw moment is simultaneously imparted to the host vehicle.

The first case, as described above, is one in which there is no match between the obstacle-containing direction $S_{out}$ and the lane departure direction $D_{out}$. In other words, there are cases in which the host vehicle 100A (host vehicle 100A in the center position of FIG. 11) traveling in the left-hand lane on a three-lane, one-way road has a tendency to depart in the right-hand direction, as shown in FIG. 11. There are also cases in which the host vehicle 100C (host vehicle 100C in the lowermost position of FIG. 11) traveling in the right-hand lane on a three-lane, one-way road has a tendency to depart in the left-hand direction, as shown in FIG. 11. There are furthermore cases in which the host vehicle 100B traveling in the center lane has a tendency to depart in the left-hand or right-hand direction. The lane departure-avoiding yaw control is carried out in this case. The host vehicle can thereby avoid departure.

A warning is issued using sound or a display along with braking control for this type of departure avoidance. For example, the warning starts the same time braking control starts or at a specified timing before braking control.

Figure 23:
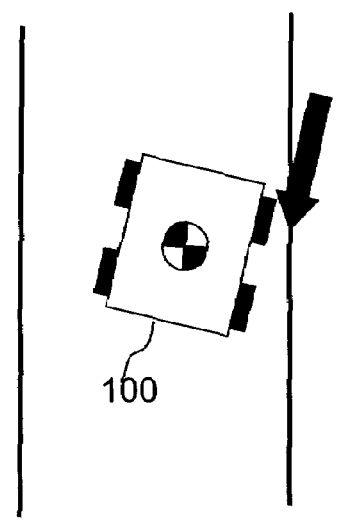
FIG. 23 shows a vehicle using deceleration control for departure-avoidance on a hill.

In contrast, the vehicle behavior is as follows when braking control is executed while the host vehicle is traveling on a hill. FIG. 22(A) shows when the host vehicle 100 is traveling uphill and FIG. 22(B) shows when the host vehicle 100 is traveling downhill. When there is a lane departure tendency while the host vehicle is traveling on a hill in this manner, there is a possibility that deceleration control for departure-avoidance will be performed as shown in FIG. 23. For this case, if the host vehicle 100 is traveling uphill as shown in FIG. 22(A), the deceleration due to the deceleration control for departure-avoidance will be set to a value smaller than when traveling on a flat road. In contrast, if the host vehicle 100 is traveling downhill as shown in FIG. 22(A), the deceleration due to the deceleration control for departure-avoidance will be set to a value larger than when traveling on a flat road.

Next, the effects of the invention will be described.

As described above, when traveling uphill, the deceleration of the deceleration control for departure-avoidance is changed to a small value. Because of this, when the host vehicle 100 is traveling uphill, the deceleration is not excessive even if the deceleration control for departure-avoidance is performed.

Furthermore, as described above, when traveling downhill, the deceleration of the deceleration control for departure-avoidance is changed to a large value. Because of this, when the host vehicle 100 is traveling downhill, the vehicle is sufficiently decelerated by the deceleration control for departure-avoidance thereby making it possible to reliably prevent departure.

Fourth Embodiment

Figure 24:
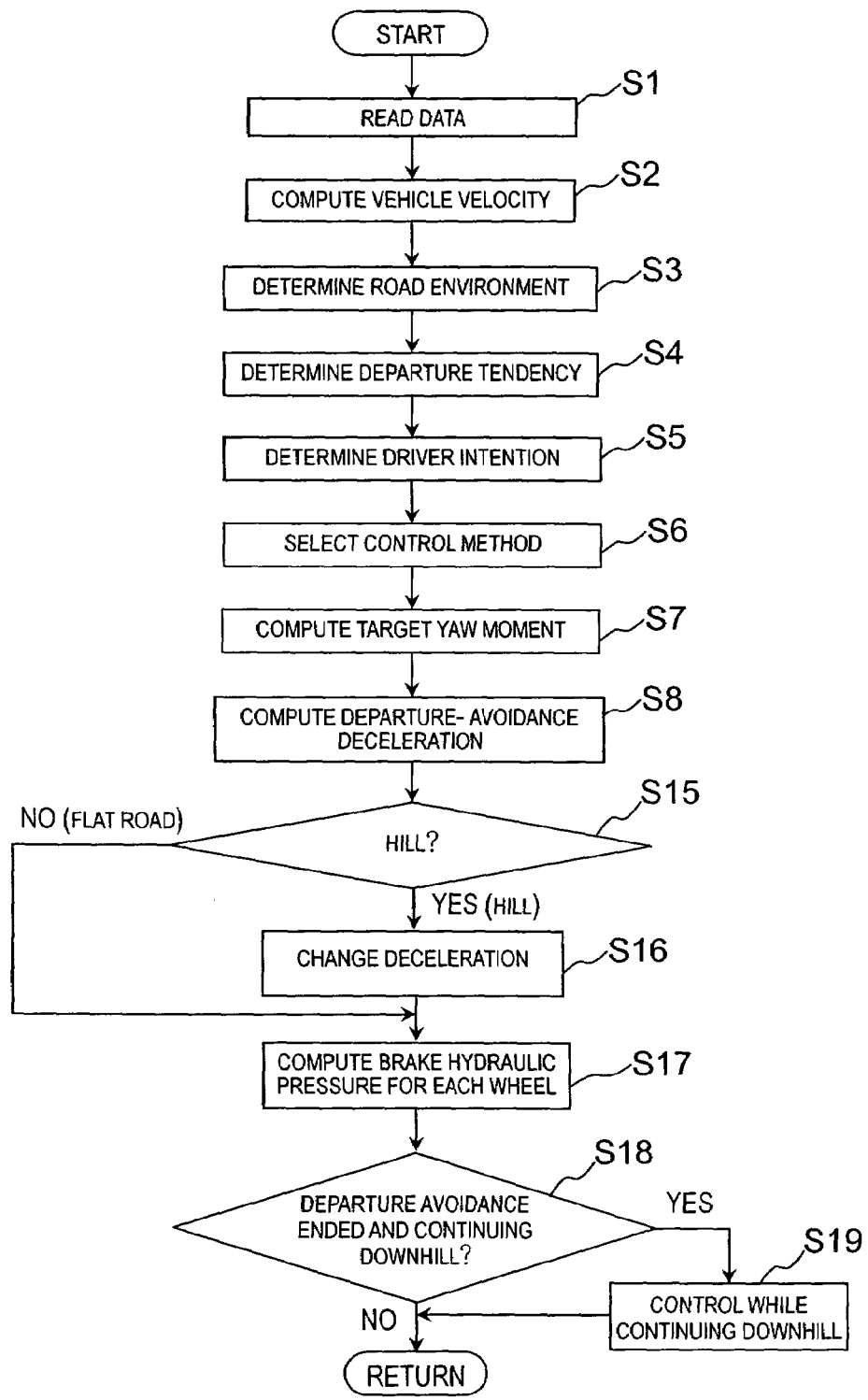
FIG. 24 is a flowchart illustrating the processing content for the driving/braking force control unit when a trailing vehicle is present in accordance with a fourth embodiment of the present invention.
Figure 25:
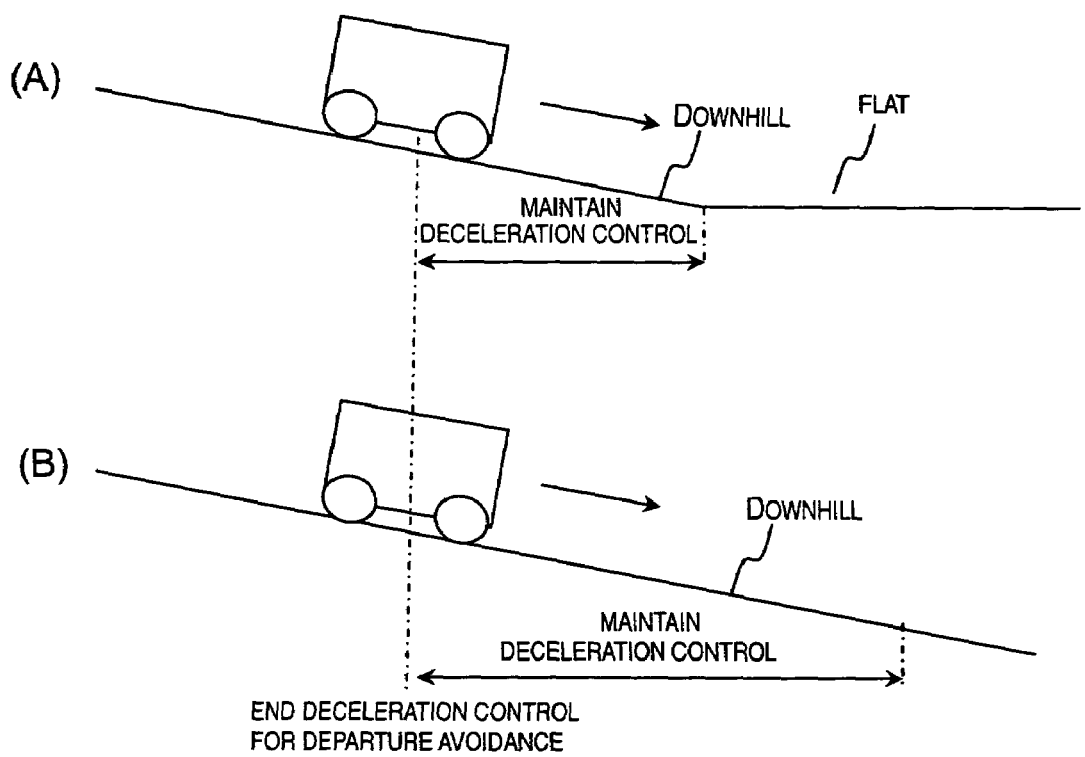
FIG. 25 is pair of diagrams used to describe the-host vehicle decelerating between a predetermined time or a predetermined distance when the host vehicle decelerates downhill and the destination of the driving road upon which departure will be prevented is downhill.

Referring now to FIGS. 24 and 25, a vehicle equipped with a lane departure prevention apparatus in accordance with a fourth embodiment will now be explained. The configuration of the vehicle in this fourth embodiment is the same as the configuration of the vehicle in the first embodiment (see FIG. 1). In view of the similarity between the fourth and prior embodiments, the parts or steps of the fourth embodiment that are identical to the parts or steps of the prior embodiments will be given the same reference numerals as the parts and steps of the prior embodiments. Moreover, the descriptions of the parts or steps of the fourth embodiment that are identical to the parts or steps of the prior embodiments may be omitted for the sake of brevity. In other words, unless otherwise specified, the rest of the configuration of the vehicle in the third embodiment is the same as the configuration of the prior embodiments.

In the fourth embodiment, when the deceleration control for departure-avoidance is performed while traveling downhill and the vehicle continues to travel downhill after avoiding departure, the deceleration control will be performed. In order to realize this, the processing content of the driving/braking force control unit 8 is made different in the fourth embodiment compared to the third embodiment.

The calculation processing procedure performed by the driving/braking force control unit 8 is shown in FIG. 24. The calculation processing procedure is almost the same as the calculation processing procedure of the first embodiment. Portions noticeably different will be described.

Namely, in step S1 to step S8 reading each type of data, calculating vehicle speed, determining driving environment, determining lane departure tendency, determining driver intent, determining control methods, calculating target yaw moments, and calculating deceleration for departure-avoidance.

In addition, whether or not the host vehicle is traveling on a hill is determined in step S15. If the host vehicle is traveling on a hill, the processing advances to step S16. If the host vehicle is traveling on a flat road, the processing advances to step S17.

Deceleration change processing is performed in step S16 (refer to FIG. 20). The target brake hydraulic pressure applied to each wheel Psi (i=fl, fr, rl, rr) is also calculated in step S17.

In like manner to the first embodiment, when the host vehicle is traveling on a flat road, the target brake hydraulic pressure applied to each wheel Psi (i=fl, fr, rl, rr) is calculated so as to obtain the deceleration calculated in step S8. When the host vehicle is traveling uphill, the deceleration calculated in step S8 will change to a small value. For this case, the deceleration will become smaller as the road inclination value becomes larger. In addition, the target brake hydraulic pressure Psi (i=fl, fr, rl, rr) applied to each wheel is calculated to be the deceleration after that change. When the host vehicle is traveling downhill, the deceleration for departure-avoidance calculated in step S8 is changed to a large value. For this case, the deceleration will become larger as the road inclination value becomes larger (as the road inclination value becomes a larger negative number). Even further, the target brake hydraulic pressure Psi (i=fl, fr, rl, rr) applied to each wheel is calculated to be the deceleration after that change.

The target brake hydraulic pressure Psi (i=fl, fr, rl, ir) calculated in this manner is output to the brake hydraulic pressure control unit 7 as a brake hydraulic pressure command value. The brake hydraulic pressure of each wheel cylinder 6FL to 6RR is individually controlled based on the brake hydraulic pressure command value by the brake hydraulic pressure control unit 7.

Whether or not the lane departure avoidance completes and the host vehicle continues to travel downhill is determined in newly created step S18. When the lane departure avoidance completes and the host vehicle continues to travel downhill here, the processing advances to step S19. When the lane departure avoidance is not complete and the host vehicle does not continue to travel downhill here, the processing of FIG. 24 ends.

Further, the determination of the completion of the lane departure avoidance is performed on the assumption that the deceleration control for departure-avoidance was performed. In other words, when the lane departure avoidance completes by the lane departure-avoidance yaw control only, the processing of FIG. 24 will end even if the host vehicle continues to travel downhill.

Control when continuing downhill is performed in step S19. More specifically, deceleration control is performed for a fixed period only. This deceleration control is performed by setting the target brake hydraulic pressure applied to each wheel Psi (i=fl, fr, rl, rr) to hydraulic pressure Pgz. The fixed period is defined as a fixed distance or fixed time. For example, the deceleration control is performed within a fixed time by means of setting the target brake hydraulic pressure applied to each wheel Psi (i=fl, fr, rl, rr) to hydraulic pressure Pgz when the deceleration control starts to reduce that hydraulic pressure over time such that that hydraulic pressure becomes 0 after a predetermined time passes.

According to the processing described above, when the deceleration control for departure-avoidance is performed while there is a lane departure tendency on a downhill, that deceleration control for departure-avoidance will be performed by the deceleration that is set larger than the ordinary value. Further, when the host vehicle is still traveling downhill after avoiding departure by means of that deceleration control for departure-avoidance, the deceleration control will be performed for only a fixed time as shown in FIG. 25(B).

FIG. 25(A) shows when the host vehicle is traveling downhill for a only predetermined interval from the spot where the deceleration control for departure-avoidance (to prevent departure) completed and the destination is a flat road. For this case, the deceleration control is only performed during the interval the host vehicle is traveling downhill from the spot where the deceleration control for departure-avoidance (to prevent departure) completed and the deceleration control is stopped or released on the destination flat road.

When it is possible to confirm the flat road from the spot where that deceleration control for departure-avoidance completed when the host vehicle is actually continuing to travel downhill from the spot where that deceleration control for departure-avoidance (to prevent departure) completed, the road will not be considered to be a hill and the deceleration control need not be performed. For example, this type of processing is effective when the distance of the predetermined interval is short.

Next, the effects of the invention in the fourth embodiment will be described.

As described above, when the host vehicle is decelerating downhill and the destination of the driving road upon which departure was prevented is downhill, the host vehicle will decelerate during a predetermined time or a predetermined distance.

Normally, after avoiding departure through the intervention of the deceleration control for departure-avoidance, the deceleration control for departure-avoidance is stopped or released. However, if the deceleration control for departure-avoidance is stopped or released after avoiding departure through the intervention of the deceleration control for departure-avoidance while traveling downhill, there is a possibility that the host vehicle might accelerate because it is traveling downhill. For this case, the driver will experience an acceleration more than the actual acceleration and feel that something is wrong. In order to prevent this type of situation, the host vehicle decelerates during a predetermined time or a predetermined distance when the host vehicle is decelerating downhill and the destination of the driving road upon which departure was prevented is downhill.

The target brake hydraulic pressure Pg was described using a specific equation (refer to Equation (4)) in the embodiments described above. However, the present invention is not limited to this. For example, the target brake hydraulic pressure Pg can be calculated using Equation (15) above.

The target hydraulic pressure differences ΔPsf and ΔPsr for the front and rear wheels are calculated in order to realize departure-avoidance yaw control in the embodiments described above (refer to Equations (8) and (9)). However, the present invention is not limited to this. For example, the lane departure-avoidance yaw control can be realized solely with front wheel target hydraulic pressure difference ΔPsf. For this case, the front wheel target hydraulic pressure difference ΔPsf is calculated using Equation (16) above.

In the descriptions of the embodiments described above, the driving/braking force control unit 8 is equipped with a departure-avoidance control method that sets the deceleration based on the hill inclination of the driving road and decelerates the host vehicle to that set deceleration in order to prevent departure of the host vehicle from the driving lane. In other words, the processing of step S16 (see FIG. 20) to change the deceleration of the driving/braking force control unit 8 shown in FIG. 19 realizes processing that sets the deceleration based on the hill inclination of the driving road. In addition, the processing of steps S6, S7, S8, S9, S15 and S16 of the driving/braking force control unit 8 shown in FIG. 19 realizes processing that decelerates the host vehicle to that set deceleration in order to prevent departure of the host vehicle from the driving lane.

Fifth Embodiment

Figure 26:
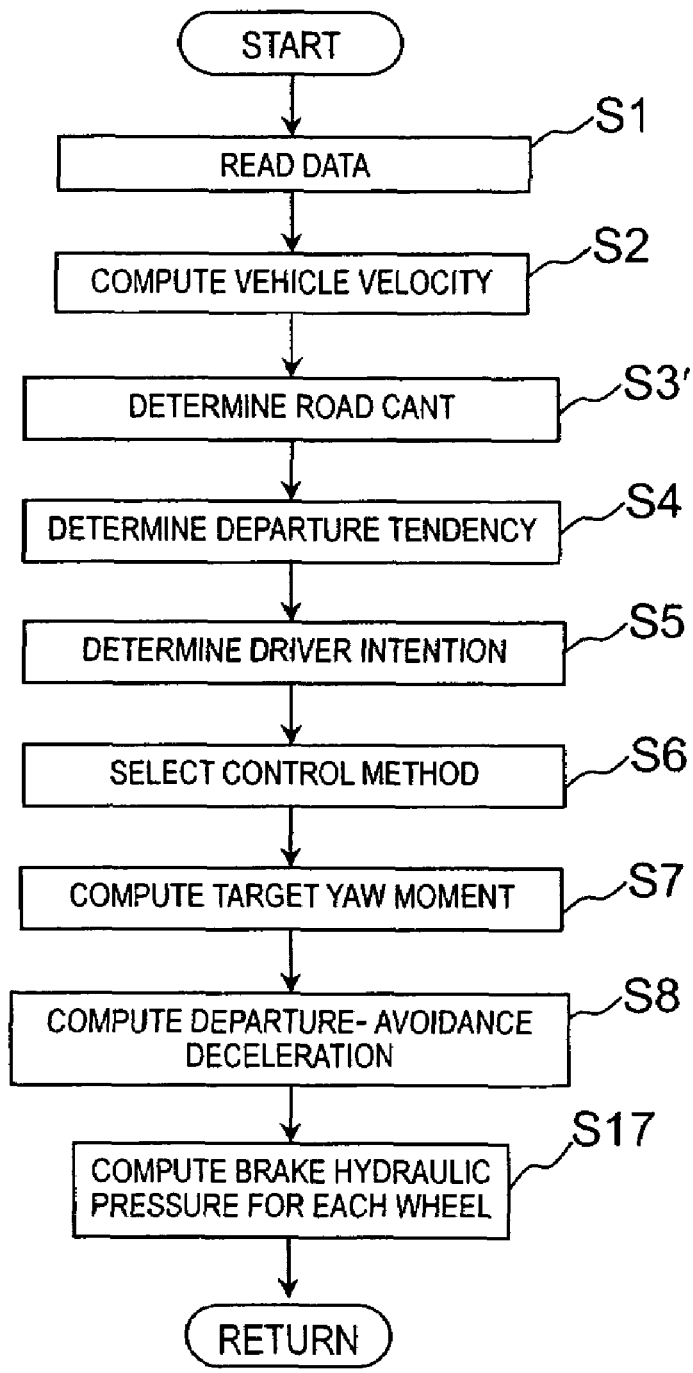
FIG. 26 is a flowchart illustrating the processing content for the driving/braking force control unit when a trailing vehicle is present in accordance with a fifth embodiment of the present invention.
Figure 27:
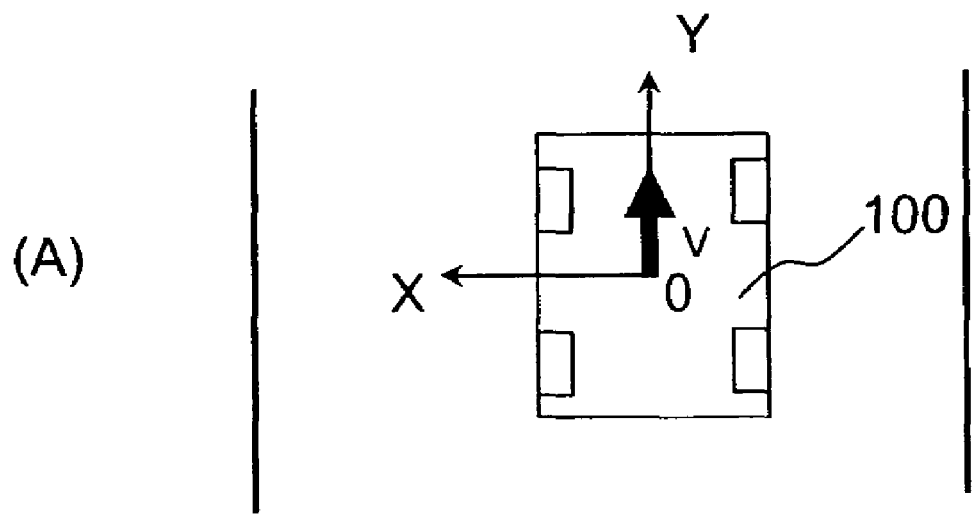
FIG. 27 is a pair of diagrams showing the relationship between the vehicle coordinate system XZY and angle θz of the road surface cant.
Figure 27:
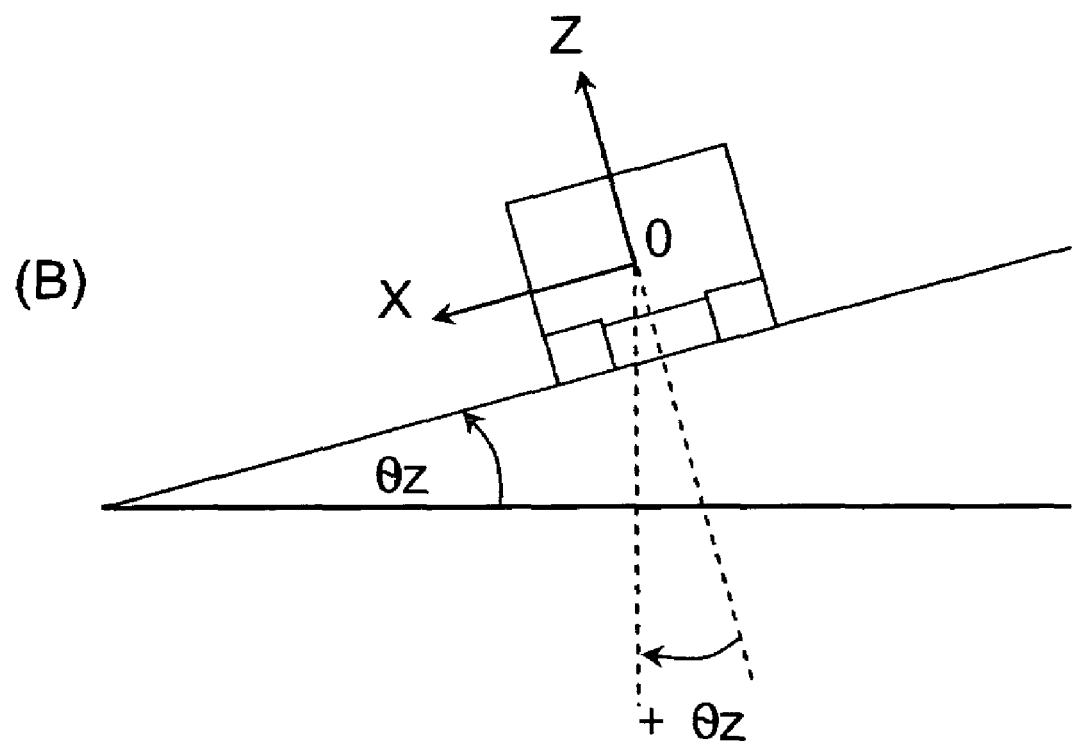

Referring now to FIGS. 26 and 27, a vehicle equipped with a lane departure prevention apparatus in accordance with a fifth embodiment will now be explained. The configuration of the vehicle in this fifth embodiment is the same as the configuration of the vehicle in the first embodiment (see FIG. 1), except for the programming changes indicated below. In view of the similarity between the fifth and prior embodiments, the parts or steps of the fifth embodiment that are identical to the parts or steps of the prior embodiments will be given the same reference numerals as the parts of the prior embodiments. Moreover, the descriptions of the parts or steps of the fifth embodiment that are identical to the parts or steps of the prior embodiments may be omitted for the sake of brevity. In other words, unless otherwise specified, the rest of the configuration of the vehicle in the fifth embodiment is the same as the configuration of the prior embodiments.

The calculation processing procedure performed by the driving/braking force control unit 8 is shown in FIG. 26. The calculation processing procedure is almost the same as the calculation processing procedure of the first embodiment. Portions noticeably different will be described.

Namely, in step S1 to step S8 reading each type of data, calculating vehicle speed, determining road cant, determining lane departure tendency, determining driver intent, determining control methods, calculating target yaw moments, and calculating deceleration for departure-avoidance. Thus, step S1 to step S8 are the same as the first embodiment, except that step S3 of the first embodiment has been replaced with step S3' in which the cant of the road is determined.

More specifically, the angle θz of the road surface cant is detected based on the longitudinal acceleration Yg, lateral acceleration Xg, up and down acceleration Zg, and yaw angle θ obtained in step S1 as well as the velocity V obtained in step S2. FIG. 27 shows the relationship between the vehicle coordinate system XZY and angle θz of the road surface cant. FIG. 27(A) is a view of the vehicle 100 as seen from above and FIG. 27(B) is a view of the vehicle 100 as seen from the rear.

For example, if there is a certain yaw angle θ when there is no road surface cant (θz=0), a certain longitudinal acceleration Yg and lateral acceleration Xg can be obtained. If there is a certain yaw angle θ when there is a road surface cant, a longitudinal acceleration Yg and lateral acceleration Xg different from the values when there is no road surface cant can be obtained. The angle θz of the road surface cant can be estimated using this type of relationship.

Furthermore, the relationship between the longitudinal acceleration Yg, lateral acceleration Xg, up and down acceleration Zg, and yaw angle θ, as well as between the velocity V and the angle θz of the road surface cant are obtained in advance as mapping data making it possible to reference this mapping data during an actual detection and obtain the angle θz of the road surface cant from the longitudinal acceleration Yg, lateral acceleration Xg, up and down acceleration Zg, yaw angle θ, and the velocity V obtained by an actual measurement.

In the description of this embodiment, when the angle θz of the road surface cant is larger than 0 (θz>0), the road surface cant is such that the left direction as seen from the vehicle is on the falling side. When the angle θz of the road surface cant is smaller than 0 (θz<0), the road surface cant is such that the right direction as seen from the vehicle is on the falling side. When the angle θz of the road surface cant is 0 (θz=0), there is no road surface cant.

The lane departure tendency is then determined in step S4. The processing procedure for this determination is specifically shown in FIG. 6, which is the same as the first embodiment, except for the processing of step S33.

In step S33, the lane departure direction $D_{out}$ is determined. More specifically, the lane departure direction $D_{out}$ is determined based on the lateral displacement X. In other words, when the vehicle is laterally displaced from the lane center in the left direction, that direction will be the lane departure direction $D_{out}$ ($D_{out}$=left) and when the vehicle is laterally displaced from the lane center in the right direction, that direction will be the lane departure direction $D_{out}$ ($D_{out}$=right).

The lane departure direction $D_{out}$ can also be determined using the lateral acceleration Xg. For example, when the lateral acceleration Xg is larger than 0 (Xg>0), the lateral acceleration Xg will accelerate towards the left. When the lateral acceleration Xg is smaller than 0 (Xg<0), the lateral acceleration Xg will accelerate towards the right. From this relationship, because the acceleration will be towards the left when the lateral acceleration Xg is larger than 0 (Xg>0), that direction will be the lane departure direction $D_{out}$ ($D_{out}$=left) and because the acceleration will be towards the right when the lateral acceleration Xg is smaller than 0 (Xg<0), that direction will be the lane departure direction $D_{out}$ ($D_{out}$=right).

Then, processing proceeds to the subsequent steps S5 to S8, which are the same as the first embodiment discussed above.

Continuing, the target brake hydraulic pressure of each wheel is calculated in step S17. In other words, the final brake hydraulic pressure is calculated based on the presence or absence of braking control for departure avoidance. More specifically, the calculations of step S17 use the Equations (5) to (10) above.

The braking force applied to the wheels is thus distributed in accordance with the magnitude of the target yaw moment Ms. That is to say, when the target yaw moment Ms is less than the threshold Ms1 used for setting purposes, the front wheel target brake hydraulic pressure difference ΔPsf is set to 0, a predetermined value is assigned to the rear wheel target brake hydraulic pressure difference ΔPsr, and the braking force difference is generated in the left and right rear wheels. When the target yaw moment Ms is equal to or greater than the threshold Ms1 used for setting purposes, a predetermined value is assigned to the target brake hydraulic force differences ΔPsf and ΔPsr, and the braking force difference is generated in the front and rear left and right wheels.

When the lane departure determination flag $F_{out}$ is ON ($F_{out}$=ON), the final target brake hydraulic pressure Psi (i=,fl, fr, rl, rr) for each wheel is calculated using the target brake hydraulic pressure differences ΔPsf and ΔPsr and the target brake hydraulic pressures Pgf and Pgr calculated as described above. More specifically, the final target brake hydraulic pressure Psi (i=fl, fr, rl, rr) for each wheel is calculated based on the braking control method selected in step S6.

The braking control method determined in step S6 will be described here.

When the lane departure determination flag $F_{out}$ is ON, the braking control method is determined based on the angle θz of the road surface cant and the lane departure direction $D_{out}$ in step S6.

As described above, the lane departure direction $D_{out}$ can be determined using the lateral acceleration Xg. In other words, when the lateral acceleration Xg is larger than 0, (Xg>0), the left direction will be the lane departure direction $D_{out}$ ($D_{out}$=left) and when the lateral acceleration Xg is smaller than 0, (Xg<0), the right direction will be the lane departure direction $D_{out}$ ($D_{out}$=right). From this type of relationship, when the angle θz of the road surface cant is larger than 0 (θz>0) and the lateral acceleration Xg is larger than 0, (Xg>0) or when the angle θz of the road surface cant is smaller than 0 (θz<0) and the lateral acceleration Xg is smaller than 0, (Xg<0), the lane departure will be on the falling side of the road surface cant. Furthermore, when the angle θz of the road surface cant is larger than 0 (θz>0) and the lateral acceleration Xg is smaller than 0, (Xg<0) or when the angle θz of the road surface cant is smaller than 0 (θz<0) and the lateral acceleration Xg is larger than 0, (Xg>0), the lane departure will be on the rising side of the road surface cant.

Based on this type of relationship, the braking control method will be described dividing up the angle θz of the road surface cant and the lane departure direction $D_{out}$ (first case to the third case).

In the first case, when there is no road surface cant (θz=0) and there is a lane departure tendency, there will be a combination of braking control (hereinafter referred to as departure-avoidance yaw control) to contribute a yaw moment to the vehicle to prevent departure and braking control (hereinafter referred to as deceleration control for departure-avoidance) to decelerate the vehicle until the lane departure determination flag $F_{out}$ is OFF. These controls to prevent departure start when departure determination flag $F_{out}$ is ON ($T_{out}$<Ts).

The lane departure-avoidance yaw control here is the magnitude of the yaw moment contributed to the vehicle in order to prevent departure as the target yaw moment Ms. The contribution of the yaw moment to the vehicle giving a difference to the braking force applied to the left and right wheels. More specifically, as described above, when the target yaw moment Ms is less than the setting threshold value Ms1, a braking force difference will be generated in the left and right rear wheels contributing the target yaw moment Ms to the vehicle. Furthermore, when the target yaw moment Ms is equal to or more than the setting threshold value Ms1, a braking force difference will be generated in the left and right front and rear wheels contributing the target yaw moment Ms to the vehicle. In addition, the deceleration control for departure-avoidance an identical amount of braking force to the left and right wheels.

When there is a lane departure tendency when the lane departure determination flag $F_{out}$ changes from ON to OFF, braking control to prevent departure will be performed or the driver themselves will attempt to an avoidance action.

In the second case, when the angle θz of the road surface cant is larger than 0 (θz>0) and the lateral acceleration Xg is larger than 0, (Xg>0) or when the angle θz of the road surface cant is smaller than 0 (θz<0) and the lateral acceleration Xg is smaller than 0 (Xg<0), there is a possibility that the lane departure tendency will be on the falling side of the road surface cant.

For this case, when the anticipated time of departure $T_{out}$ becomes smaller than the lane departure determination threshold value (Ts+dTkdown) in which a certain prescribed amount dTkdown is added to the first departure determination threshold value Ts ($T_{out}$<(Ts+dTkdown)), the deceleration control for departure-avoidance will be performed. Furthermore, when the second departure determination threshold value Tr less than the first departure determination threshold value Ts (Ts>Tr>0) is defined and the anticipated time of departure $T_{out}$ becomes smaller than the second departure determination threshold value Tr ($T_{out}$<Tr), the lane departure-avoidance yaw control will be performed in addition to the deceleration control for departure-avoidance.

For example, the prescribed amount dTkdown is a value less than the first departure determination threshold value Ts (Ts>dTkdown).

Because of this, when the anticipated time of departure $T_{out}$ becomes smaller than the lane departure determination threshold value (Ts+dTkdown) ($T_{out}$<(Ts+dTkdown)), the deceleration control for departure-avoidance is started and when the anticipated time of departure $T_{out}$ becomes smaller than the second departure determination threshold value Tr ($T_{out}$<Tr), the lane departure-avoidance yaw control will be started in addition to the deceleration control for departure-avoidance. At this time, the start timing for the deceleration control for departure-avoidance is set earlier by the prescribed amount dTkdown portion only compared to when there is no road surface cant.

Further, the prescribed amount dTkdown becomes larger as the absolute value of the angle θz of the road surface cant becomes larger. Consequently, the start timing for the deceleration control for departure-avoidance becomes earlier as the inclination of the road surface cant becomes larger.

In the third case, when the angle θz of the road surface cant is larger than 0 (θz>0) the lateral acceleration Xg is smaller than 0, (Xg<0) or when the angle θz of the road surface cant is smaller than 0 (θz<0) and the lateral acceleration Xg is larger than 0, (Xg>0), there is a possibility that the lane departure tendency will be on the rising side of the road surface cant.

For this case, when the anticipated time of departure $T_{out}$ becomes smaller than the lane departure determination threshold value in which a certain prescribed amount dTkup is subtracted from the first departure determination threshold value Ts (Ts−dTkdown) ($T_{out}$<(Ts−dTkdown)), the lane departure-avoidance yaw control will be performed.

Here, when the certain prescribed amount dTkup is larger than 0, it will be a value smaller than the first departure determination threshold value Ts (Ts>dTkup>0). Because of this, the start timing for the lane departure-avoidance yaw control will become earlier when there is not road surface cant.

Further, the prescribed amount dTkup becomes larger as the absolute value of the angle θz of the road surface cant becomes larger. Consequently, the start timing for the lane departure-avoidance yaw control becomes earlier as the inclination of the road surface cant becomes larger.

The lateral acceleration Xg was used in the determination of the lane departure direction in the description of the first case to the third case above although the lane departure direction $D_{out}$ can also be used in the determination of the lane departure direction.

In step S6, various braking control methods are determined in response to the values of the angle θz of the road surface cant and the lane departure direction $D_{out}$ or the lateral acceleration Xg. In other words, the braking control methods to prevent departure are determined as only the lane departure-avoidance yaw control or a combination of the lane departure-avoidance yaw control and the deceleration control for departure-avoidance in response to the values of the angle θz of the road surface cant and the lane departure direction $D_{out}$ or the lateral acceleration Xg.

The target brake hydraulic pressure Psi (i=fl, fr, rl, rr) for each wheel is calculated in step S17 in accordance with each type of braking control method.

In the lane departure-avoiding yaw control for the third case, for example, the target brake hydraulic pressure Psi (i=fl, fr, rl, rr) for each wheel is calculated with Equation (11) above.

The lane departure-avoiding yaw control and the lane departure-avoiding deceleration control are carried out in the first and second cases, but in this case the target brake hydraulic pressure Psi (i=fl, fr, rl, rr) for each wheel is calculated with Equation (12) above.

Also, the target brake hydraulic pressure Psi (i=fl, fr, rl, rr) for each wheel is calculated with reference to the deceleration action taken by the driver. In other words, the master cylinder hydraulic pressures Pmf and Pmr are applied, as shown in Equations (11) and (12).

The above describes the processing for step S117. Thus, the target brake hydraulic pressure Psi (i=fl, fr, rl, rr) for each wheel is calculated based on the state of the lane departure determination flag $F_{out}$. When the lane departure determination flag $F_{out}$ is ON, the target brake hydraulic pressure Psi (i=fl, fr, rl, rr) for each wheel is calculated in accordance with the braking control method selected in step S6 in response to the relationship between the angle θz of the road surface cant, the lateral acceleration Xg and the value of the lane departure direction $D_{out}$.

In the description above, the calculations are processed by the driving/braking force control unit 8. The driving/braking force control unit 8 outputs the target brake hydraulic pressure Psi (i=fl, fr, rl, rr) for each wheel calculated in step S17 to the brake hydraulic pressure control unit 7 as a brake hydraulic pressure command value.

A brief description of operation of the lane departure prevention apparatus described is as follows.

At first, each type of data is read from each sensor, controller and control unit (step S1). Then, the velocity is calculated (step S2).

Then, the road surface cant is detected (step S3). More specifically, when the angle θz of the road surface cant is referenced and the angle θz of the road surface cant is larger than 0 (θz>0), a road surface cant will be detected on the falling side in the left direction as seen from the vehicle. When the angle θz of the road surface cant is smaller than 0 (θz<0), a road surface cant will be detected on the falling side in the right direction as seen from the vehicle. When the angle θz of the road surface cant is 0 (θz=0), no road surface cant will be detected.

In step S4, the lane departure determination flag $F_{out}$ is set based on the estimated time of departure $T_{out}$ (see FIG. 6), and the lane departure direction $D_{out}$ is determined based on the lateral displacement X.

Furthermore, the driver's intention to change lanes is determined based on the lane departure direction $D_{out}$ obtained in this manner and/or on the direction (lighted blinker side) indicated by the turn signal switch 20 (step S5).

For example, when the direction (lighted blinker side) indicated by the turn switch signal and the direction indicated by the lane departure direction $D_{out}$ are the same, it is determined that the driver is intentionally changing lanes. In this case, the lane departure determination flag $F_{out}$ is changed to OFF.

When the direction (lighted blinker side) indicated by the turn switch signal and the direction indicated by the lane departure direction $D_{out}$ are different, the lane departure determination flag $F_{out}$ is kept unchanged in the case that it is ON. The reason is that when the direction (lighted blinker side) indicated by the turn switch signal and the direction indicated by the lane departure direction $D_{out}$ are different, the lane departure behavior of the host vehicle may be due to factors other than the driver's intention to change lanes or the like, so the condition of the lane departure determination flag $F_{out}$ is kept unchanged when the flag is ON.

That method is determined for the presence or absence of a warning start for departure avoidance, the presence or absence of braking control for departure avoidance and when implementing braking control for departure avoidance based on the angle θz of the road surface cant, the determination flag $F_{out}$ and the lane departure direction $D_{out}$ or the lateral acceleration Xg (step S6).

Further, the target yaw moment Ms is calculated based on lateral displacement X and the variation amount dx (step S7), and deceleration control for departure avoidance is also calculated (step S8).

The target brake hydraulic pressure applied to each wheel Psi (i=fl, fr, rl, rr) for the purpose of realizing the braking control methods determined based on the angle θz of the road surface cant, the determination flag $F_{out}$ and the lane departure direction $D_{out}$ or the lateral acceleration Xg are calculated. The calculated target brake hydraulic pressure Psi (i=fl, fr, rl, rr) is output to the brake hydraulic pressure control unit 7 as a brake hydraulic pressure command value (step S17). The brake hydraulic pressure of each wheel cylinder 6FL to 6RR is individually controlled based on the brake hydraulic pressure command value by the brake hydraulic pressure control unit 7. Because of this, when there is a lane departure tendency, the following vehicle behavior is exhibited in response to the road surface cant.

When the determination flag $F_{out}$ is ON while there is a lane departure tendency and there is no road surface cant ($T_{out}$<Ts), the deceleration control for departure avoidance and departure-avoidance yaw control will be combined. Further, this control to prevent departure will be performed until the determination flag $F_{out}$ is OFF (first case). Consequently, the host vehicle is prevented from departing. In contrast, the driver feels lateral acceleration or deceleration in the driving direction due to the lane departure avoidance operations of the vehicle thereby making it possible for the driver to know there is a lane departure tendency for the host vehicle.

When the angle θz of the road surface cant is larger than 0 (θz>0) and the lateral acceleration Xg is larger than 0 (Xg>0) or the angle θz of the road surface cant is smaller than 0 (θz<0) and the lateral acceleration Xg is smaller than 0 (Xg<0), namely, when the lane departure tendency is on the falling side of the road surface cant, the deceleration control for departure avoidance when the anticipated time of departure $T_{out}$ becomes smaller ($T_{out}$<(Ts+dTkdown)) than the lane departure determination threshold value (Ts+dTkdown). Even further, the lane departure-avoidance yaw control will be performed in addition to the deceleration control for departure avoidance when the anticipated time of departure $T_{out}$ becomes smaller than the second departure determination threshold value Tr ($T_{out}$<Tr). Consequently, the host vehicle is prevented from departing. In contrast, the driver feels deceleration in the driving direction due to the lane departure avoidance operations of the vehicle thereby making it possible for the driver to know there is a lane departure tendency for the host vehicle. The lane departure-avoidance deceleration control will operate earlier as set by the prescribed amount dTkdown than when there is no road surface cant.

When the angle θz of the road surface cant is larger than 0 (θz>0) and the lateral acceleration Xg is smaller than 0 (Xg<0) or the angle θz of the road surface cant is smaller than 0 (θz<0) and the lateral acceleration Xg is larger than 0 (Xg>0), namely, when the lane departure tendency is on the rising side of the road surface cant, the yaw control for departure avoidance when the anticipated time of departure $T_{out}$ becomes smaller ($T_{out}$<(Ts−dTkup)) than the lane departure determination threshold value (Ts−dTkup). Consequently, the host vehicle is prevented from departing. In contrast, the driver feels deceleration in the lateral direction due to the lane departure avoidance operations of the vehicle thereby making it possible for the driver to know there is a lane departure tendency for the host vehicle. The lane departure-avoidance yaw control will operate later than when there is no road surface cant.

Next, the effects of the invention will be described.

As described above, when the anticipated time of departure $T_{out}$ becomes smaller ($T_{out}$<(Ts+dTkdown)) than the lane departure determination threshold value (Ts+dTkdown) while the lane departure tendency is on the falling side of the road surface cant, the deceleration control for departure avoidance is performed. The start timing for this control is set earlier by the prescribed amount dTkdown portion only compared to when there is no road surface cant.

Consequently, the deceleration control for departure avoidance can start without delay when there is a lane departure tendency making it possible to optimally control the lane departure avoidance.

Furthermore, as described above, when the anticipated time of departure $T_{out}$ becomes smaller ($T_{out}$<(Ts−dTkup)) than the lane departure determination threshold value (Ts−dTkup) when the lane departure tendency is on the rising side of the road surface cant, the lane departure-avoidance yaw control will be performed. This control start timing will be delayed more than when thee is no road surface cant.

Consequently, the lane departure-avoidance yaw control can start without the need to be earlier. This makes it possible for the operation of this control to be excessively early without annoying the driver.

The embodiments of the present invention were described above. However, the present invention is not limited to this. That is, methods of combining braking control (departure-avoidance yaw control) so that yaw moment for avoiding departure is imparted to the vehicle, and deceleration control (departure-avoidance deceleration control) for decelerating to avoiding departure, the operating procedures of these methods, and the control amounts thereof (magnitude of the yaw moment and magnitude of the deceleration) were described in detail in the above embodiments, but it should go without saying that the present invention is not limited by these descriptions.

For example, as described above, when the lane departure tendency is on the falling side of the road surface cant, the deceleration control for departure avoidance will be performed as control to prevent departure. However, when the lane departure tendency is on the falling side of the road surface cant, the lane departure-avoidance yaw control can also be performed as control to prevent departure. In addition, as described above, when the lane departure tendency is on the rising side of the road surface cant, the lane departure-avoidance yaw control is performed as control to prevent departure. However, when the lane departure tendency is on the rising side of the road surface cant, the deceleration control for departure avoidance can also be performed as control to prevent departure.

Further, the brake structure described in the embodiments above is one in which hydraulic pressure is used. However, the present invention is not limited to this. It is also possible, for example, to use electric powered friction brakes that press a friction material to the rotor of a wheel side member by means of an electric actuator, or regenerative brakes or dynamic brakes that electrically cause braking action. Other options include engine brakes that provide braking control by changing the valve timing or the like of the engine, gear brakes that operate as engine brakes by changing the gear ratio, or air brakes.

Also, in the above embodiments the estimated time of departure $T_{out}$ was calculated on the basis of the lateral displacement X and the amount of change dx therein (see Equation (2) above), but the estimated time of departure $T_{out}$ can be obtained by some other method. For instance, the estimated time of departure $T_{out}$ can be obtained on the basis of the yaw angle φ, the driving lane curvature β, the yaw rate φ', or the steering angle δ.

Also, in the above embodiments the intention of the driver to make a lane change was ascertained on the basis of the steering angle δ and the amount of change Δδ therein (see step S5), but the intention of the driver to make a lane change can be ascertained by some other method. For instance, the intention of the driver to make a lane change can be ascertained on the basis of the steering torque.

Also, the target yaw moment Ms was calculated in the above embodiments on the basis of the lateral displacement X and the amount of change dx (see Equation (3) above), but the target yaw moment Ms can also be obtained by another method. For instance, the target yaw moment Ms can be obtained on the basis of the yaw angle φ, the lateral displacement X, or the driving lane curvature β, as shown in Equation (14) above Also, the target brake hydraulic pressure Pgf for the front wheels was described in the above embodiments by using a specific equation (see Equation 4), but the present invention is not limited to this. For instance, the target brake hydraulic pressure Pgf for the front wheels can also be calculated from Equation (15) above.

The target hydraulic pressure differentials ΔPsf and ΔPsr for the front and rear wheels are calculated in order to realize departure-avoidance yaw control in the embodiments described above (refer to equations (7) and (8)). However, the present invention is not limited to this. For example, the lane departure-avoidance yaw control can be realized solely with front wheel target hydraulic pressure difference ΔPsf. For this case, the front wheel target hydraulic pressure difference ΔPsf is calculated using equation (16) above.

In the descriptions of the embodiments described above, the driving/braking force control unit 8 is equipped with a departure-avoidance control method that sets the start timing for the control to prevent departure based on the road surface cant and starts the control to prevent departure using that start timing when there is a tendency for the host vehicle to depart from the driving lane. In other words, the setting of the lane departure determination threshold value made in step S6 shown in FIG. 2 of the driving/braking force control unit 8 realizes processing that sets the start timing for the control to prevent departure based on the road surface cant. The processing of step S6 to step S9 shown in FIG. 2 of the driving/braking force control unit 8 realizes processing that starts the control to prevent departure using that start timing and prevents the lane departure when there is a tendency for the host vehicle to depart from the driving lane.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to each of the following Japanese Patent Application Nos. 2003-385611, 2003-385612 and 2003-388208. The entire disclosures of Japanese Patent Application Nos. 2003-385611, 2003-385612 and 2003-388208 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lane departure prevention apparatus comprising:
a driving road detecting section configured to determine a road slope direction of a driving road upon which a host vehicle is traveling; and
a lane departure avoidance control section configured to start lane departure avoidance control based on a driving direction of the host vehicle and the road slope direction detected by the driving road detecting section,
the lane departure avoidance control section being further configured to control a braking force to decelerate the host vehicle in addition to imparting a yaw moment in a direction avoiding departure of the host vehicle from a driving lane.

2. A lane departure prevention apparatus comprising:
a driving road detecting section configured to determine a road slope direction of a driving road upon which a host vehicle is traveling;
a lane departure avoidance control section configured to start lane departure avoidance control based on a driving direction of the host vehicle and the road slope direction detected by the driving road detecting section;
a yaw control amount calculating section configured to calculate a first braking force control amount such that a braking yaw moment is generated in a direction avoiding departure of the host vehicle from a driving lane; and
a braking control amount calculating section configured to calculate a second braking force control amount such that a braking deceleration force is produced to decelerate the host vehicle,
the lane departure avoidance control section being configured to set deceleration by the second braking force control amount based on the road slope direction of the driving road.

3. The lane departure prevention apparatus according to claim 2, wherein
the lane departure avoidance control section is configured to set a start timing earlier when the road slope direction is a lateral cant with the host vehicle tending to depart on a downward sloping side of the road slope direction.

4. A lane departure prevention apparatus comprising:
a driving road detecting section configured to determine a road slope direction of a driving road upon which a host vehicle is traveling; and
a lane departure avoidance control section configured to start lane departure avoidance control based on a driving direction of the host vehicle and the road slope direction detected by the driving road detecting section,
the lane departure avoidance control section being further configured to set a start timing later when the host vehicle tends to depart on an upward sloping side of the road slope direction.

5. A lane departure prevention apparatus comprising:
a driving road detecting section configured to determine a road slope direction of a driving road upon which a host vehicle is traveling; and
a lane departure avoidance control section configured to start lane departure avoidance control based on a driving direction of the host vehicle and the road slope direction detected by the driving road detecting section,
the lane departure avoidance control section being further configured to maintain the deceleration of the host vehicle between a predetermined time or a predetermined distance when the road slope direction is a downhill slope with respect to a driving direction of the host vehicle and the host vehicle is decelerating downhill.

6. A lane departure prevention apparatus comprising:
a driving road detecting section configured to determine a road slope direction of a driving road upon which a host vehicle is traveling; and
a lane departure avoidance control section configured to start lane departure avoidance control based on a driving direction of the host vehicle and the road slope direction detected by the driving road detecting section,
the lane departure avoidance control section being further configured to control lane departure avoidance by setting vehicle deceleration that is calculated based on a lateral movement of the host vehicle with respect to the driving road and the road slope direction of the driving road.

7. The lane departure prevention apparatus according to claim 6, wherein
the lane departure avoidance control section is configured to set the vehicle deceleration to a smaller value when the road slope direction is an uphill slope with respect to a driving direction of the host vehicle.

8. The lane departure prevention apparatus according to claim 6, wherein
the lane departure avoidance control section is configured to set the vehicle deceleration to a larger value when the road slope direction is a downhill slope with respect to a driving direction of the host vehicle.

9. A lane departure prevention apparatus comprising:
a driving road detecting section configured to determine a road curvature direction of a driving road upon which a host vehicle is traveling; and
a lane departure avoidance control section configured to start lane departure avoidance control based on a driving direction of the host vehicle and a road curvature direction detected by the driving road detecting section,
the lane departure avoidance control section being configured to change lane departure-avoidance control in accordance with that a lane departure direction towards an inside direction or an outside direction of the road curvature direction of the driving road, and impart at least one of a yaw moment to the host vehicle by a braking control and a deceleration braking force that decelerates the host vehicle to prevent the host vehicle from departing from a driving lane when the host vehicle tends to depart from the driving lane,
the lane departure avoidance control section being further configured to decelerate the host vehicle after contributing the yaw moment to the host vehicle and avoiding the host vehicle from departing by imparting the yaw moment when the host vehicle tends to depart towards the inside direction of the road curvature direction of the driving road as well as when a nearby vehicle traveling in approximately the same direction as the host vehicle is located at the rear of the host vehicle.

10. A lane departure prevention apparatus comprising:
a driving road detecting section configured to determine a road curvature direction of a driving road upon which a host vehicle is traveling; and
a lane departure avoidance control section configured to start lane departure avoidance control based on a driving direction of the host vehicle and the road curvature direction detected by the driving road detecting section,
the lane departure avoidance control section being further configured to change a magnitude of a contribution of a yaw moment to the host vehicle in accordance with a lane departure direction towards an inside direction or an outside direction of the road curvature direction of the driving road,
the lane departure avoidance control section being further configured to suppress the contribution of the yaw moment to the host vehicle upon determining that the lane departure direction is towards the inside direction of the road curvature direction of the driving road.

11. The lane departure prevention apparatus according to claim 10, wherein
the lane departure avoidance control section is configured to impart at least one of the yaw moment to the host vehicle by a braking control and a deceleration braking force that decelerates the host vehicle to prevent the host vehicle from departing from a driving lane when the host vehicle tends to depart from the driving lane.

12. A lane departure prevention apparatus comprising:
driving road detecting means for determining a road slope direction of a driving road upon which a host vehicle is traveling; and
lane departure-avoidance control means for starting lane departure avoidance control based on a driving direction of the host vehicle and the road slope direction detected by the driving road detecting means,
the lane departure-avoidance control means further controlling a braking force to decelerate the host vehicle in addition to imparting a yaw moment in a direction avoiding departure of the host vehicle from a driving lane.

13. A lane departure prevention apparatus comprising:
a driving road detecting section configured to determine a road curvature direction of a driving road upon which a host vehicle is traveling; and
a lane departure avoidance control section configured to start lane departure avoidance control based on a driving direction of the host vehicle and a road curvature direction detected by the driving road detecting section,
the lane departure avoidance control section being configured to change lane departure-avoidance control in accordance with a lane departure direction towards an inside direction or an outside direction of the road curvature direction of the driving road, impart at least one of a yaw moment to the host vehicle by a braking control and a deceleration braking force that decelerates the host vehicle to prevent the host vehicle from departing from a driving lane when the host vehicle tends to depart from the driving lane, the lane departure avoidance control section being further configured to prohibit the contribution of the yaw moment to the host vehicle when the host vehicle tends to depart towards the inside direction of the road curvature direction of the driving road.

14. The lane departure prevention apparatus according to claim 13, wherein the lane departure avoidance control section is configured to prohibit the contribution of the yaw moment to the host vehicle when the host vehicle tends to depart towards the inside direction of the road curvature direction of the driving road as well as when no nearby vehicle traveling in approximately the same direction as the host vehicle is located at the rear of the host vehicle.

15. A method of avoiding lane departure of a host vehicle comprising:

determining a road curvature direction of a driving road upon which a host vehicle is traveling; and starting lane departure avoidance control based on a driving direction of the host vehicle and the road curvature direction detected by the determining the road curvature direction, the determining of the road curvature direction including determining whether the driving road has an inside/outside road curvature direction, and changing a magnitude of a contribution of a yaw moment to the host vehicle based a lane departure direction of the host vehicle with respect to the inside/outside road curvature direction, the changing of the magnitude of the contribution of the yaw moment to the host vehicle further including suppressing the contribution of the yaw moment to the host vehicle upon determining that the lane departure direction of the host vehicle is towards the inside road curvature direction.

16. A lane departure prevention apparatus comprising:

driving road detecting means for determining a road curvature direction of a driving road upon which a host vehicle is traveling; and lane departure-avoidance control means for starting lane departure avoidance control based on a driving direction of the host vehicle and the road curvature direction detected by the driving road detecting means, the lane departure-avoidance control means including changing a magnitude of a contribution of a yaw moment to the host vehicle in accordance with a lane departure direction towards an inside direction or an outside direction of the road curvature direction of the driving road, the lane departure-avoidance control means further including suppressing the contribution of the yaw moment to the host vehicle upon determining the lane departure direction is towards the inside direction of the road curvature direction of the driving road.

17. A method of avoiding lane departure of a host vehicle comprising:

determining a road slope direction of a driving road upon which a host vehicle is traveling;

starting lane departure avoidance control based on a driving direction of the host vehicle and the road slope direction detected by the determining the road slope direction; and controlling a braking force to decelerate the host vehicle in addition to imparting a yaw moment in a direction avoiding departure of the host vehicle from a driving lane.

18. A method of avoiding lane departure of a host vehicle comprising:

determining a road slope direction of a driving road upon which a host vehicle is traveling; and starting lane departure avoidance control based on a driving direction of the host vehicle and the road slope direction detected by the determining the road slope direction, the determining of the road slope direction including determining whether the driving road has a lateral cant of the driving road, and controlling the lane departure avoidance control based on the lateral cant.

19. A method of avoiding lane departure of a host vehicle comprising:

determining a road slope direction of a driving road upon which a host vehicle is traveling; and starting lane departure avoidance control based on a driving direction of the host vehicle and the road slope direction detected by the determining the road slope direction, the determining of the road slope direction including determining whether the driving road has an uphill/downhill inclination with respect to a driving direction of the host vehicle, and controlling the lane departure avoidance control by setting vehicle deceleration that is calculated based on a lateral movement of the host vehicle with respect to the driving road and the uphill/downhill inclination.

* * * * *